US006952645B1

(12) United States Patent
Jones

(10) Patent No.: US 6,952,645 B1
(45) Date of Patent: Oct. 4, 2005

(54) SYSTEM AND METHOD FOR ACTIVATION OF AN ADVANCE NOTIFICATION SYSTEM FOR MONITORING AND REPORTING STATUS OF VEHICLE TRAVEL

(75) Inventor: Martin Kelly Jones, Dalton, GA (US)

(73) Assignee: ArrivalStar, Inc., Delray Beach, FL (US)

(*) Notice: Subject to any disclaimer, the term of this patent is extended or adjusted under 35 U.S.C. 154(b) by 0 days.

(21) Appl. No.: 09/163,588

(22) Filed: Sep. 30, 1998

Related U.S. Application Data

(63) Continuation-in-part of application No. 08/852,119, filed on May 6, 1997, now Pat. No. 6,748,318.

(60) Provisional application No. 60/039,925, filed on Mar. 7, 1997.

(51) Int. Cl.[7] .............................................. G01C 21/26

(52) U.S. Cl. ...................... 701/201; 701/200; 701/207; 340/989; 340/991; 340/994; 455/414.2; 455/456.1; 455/456.2

(58) Field of Search .................... 701/23–26, 200–201, 701/207, 202, 117; 340/988–994; 455/412.1–412.2, 414.1–414.3, 456.1–456.6, 457

(56) References Cited

U.S. PATENT DOCUMENTS

| | | | | |
|---|---|---|---|---|
| 3,644,883 A | 2/1972 | Borman et al. | ............... | 340/23 |
| 3,845,289 A | 10/1974 | French | .................... | 235/151.2 |
| 3,934,125 A | 1/1976 | Macano | .................. | 235/150.2 |
| 4,297,672 A | 10/1981 | Fruchey et al. | ............... | 340/23 |
| 4,325,057 A | 4/1982 | Bishop | ....................... | 340/539 |
| 4,350,969 A | 9/1982 | Greer | .......................... | 340/23 |
| 4,713,661 A | 12/1987 | Boone et al. | ............... | 340/994 |
| 4,791,571 A | 12/1988 | Takahashi et al. | .......... | 364/436 |
| 4,799,162 A | 1/1989 | Shinkawa et al. | .......... | 364/436 |
| 4,812,843 A | 3/1989 | Champion, III et al. | .... | 340/905 |

(Continued)

FOREIGN PATENT DOCUMENTS

| | | | | |
|---|---|---|---|---|
| EP | 0219859 A2 | 4/1987 | ............ | G08G/1/12 |
| EP | 0805427 A1 | 11/1997 | .......... | G08G/1/123 |
| FR | 2 559 930 | 8/1985 | ............ | G08G/1/12 |
| JP | 52066175 | 6/1977 | | |
| JP | 63288400 | 11/1988 | ............ | G08G/1/12 |
| WO | WO 90/01236 | 2/1990 | ............ | H04M/1/54 |
| WO | WO 93/13503 | 7/1993 | ............ | G08B/5/22 |
| WO | WO 94/02922 | 2/1994 | .......... | G08G/1/123 |
| WO | WO 94/27264 | 11/1994 | .......... | G08G/1/123 |
| WO | WO 96/04634 | 2/1996 | ............ | G08G/5/22 |
| WO | WO 96/16386 | 5/1996 | .......... | G08G/1/123 |
| WO | WO 98/07128 | 2/1998 | .......... | G08G/1/123 |
| WO | WO 98/08206 | 2/1998 | .......... | G08G/1/123 |
| WO | WO 98/14926 | 4/1998 | .......... | G08G/1/123 |
| WO | WO 98/40837 | 9/1998 | ............ | G06G/7/70 |

OTHER PUBLICATIONS

"Public Transportation Information and Management Ssytems", IEE Colloquium, Computing and Control Division, May 25, 1993, pp. 9/1–9/4, 12/1–12/2, 7/1–7/3.

(Continued)

*Primary Examiner*—Jacques H. Louis-Jacques

(57) ABSTRACT

Generally, the present invention automatically monitors the travel of vehicles in response to requests from users at remote locations. In this regard, a user at a remote location submits a vehicle indicator (such as a bus number, for example) and a location indicator (such as a bus stop number, for example) to a data manager at a vehicle tracking system. The data manager automatically retrieves travel data and location data based on the vehicle indicator and the location indicator. The travel data indicates the current location of the vehicle identified by the vehicle value, and the location data represents a location along the vehicle's route of travel. The data manager then compares the travel data and the location data in order to determine whether the vehicle is a predetermined proximity from the location represented by the location data. When the vehicle is a predetermined proximity from the location identified by the location data (i.e., arrival of the vehicle at the location is imminent), the data manager automatically transmits a notification message to the user at the remote location.

47 Claims, 7 Drawing Sheets

U.S. PATENT DOCUMENTS

| | | | | | |
|---|---|---|---|---|---|
| 4,894,649 | A | | 1/1990 | Davis | 340/825.44 |
| 4,956,777 | A | | 9/1990 | Cearley et al. | 364/424.02 |
| 5,021,780 | A | | 6/1991 | Fabiano et al. | 340/994 |
| 5,097,429 | A | | 3/1992 | Wood et al. | 364/569 |
| 5,113,185 | A | | 5/1992 | Ichikawa | 340/995 |
| 5,121,326 | A | | 6/1992 | Moroto et al. | 364/449 |
| 5,122,959 | A | | 6/1992 | Nathanson et al. | 364/436 |
| 5,131,020 | A | | 7/1992 | Liebesny et al. | 379/59 |
| 5,144,301 | A | | 9/1992 | Jackson et al. | 340/994 |
| 5,155,689 | A | * | 10/1992 | Wortham | 701/207 |
| 5,168,451 | A | * | 12/1992 | Bolger | 701/117 |
| 5,218,629 | A | | 6/1993 | Dumond, Jr. et al. | 379/59 |
| 5,223,844 | A | | 6/1993 | Mansell et al. | 342/357 |
| 5,271,484 | A | | 12/1993 | Bahjat et al. | 187/29.1 |
| 5,299,132 | A | | 3/1994 | Wortham | 364/460 |
| 5,323,456 | A | | 6/1994 | Oprea | 379/375 |
| 5,351,194 | A | | 9/1994 | Ross et al. | 364/449 |
| 5,361,296 | A | | 11/1994 | Reyes et al. | 379/96 |
| 5,381,338 | A | | 1/1995 | Wysocki et al. | 364/449 |
| 5,394,332 | A | | 2/1995 | Kuwahara et al. | 364/449 |
| 5,398,190 | A | * | 3/1995 | Wortham | 701/207 |
| 5,400,020 | A | | 3/1995 | Jones | 340/994 |
| 5,420,794 | A | * | 5/1995 | James | 701/117 |
| 5,428,546 | A | | 6/1995 | Shah et al. | 364/449 |
| 5,432,841 | A | * | 7/1995 | Rimer | 379/59 |
| 5,444,444 | A | | 8/1995 | Ross | 340/994 |
| 5,446,678 | A | | 8/1995 | Saltzstein et al. | 364/514 |
| 5,448,479 | A | | 9/1995 | Kemner et al. | 365/424.02 |
| 5,461,374 | A | | 10/1995 | Lewiner et al. | 340/994 |
| 5,493,295 | A | | 2/1996 | Lewiner et al. | 340/994 |
| 5,493,694 | A | | 2/1996 | Vlcek et al. | 455/53.1 |
| 5,513,111 | A | | 4/1996 | Wortham | 364/460 |
| 5,519,621 | A | | 5/1996 | Wortham | 364/460 |
| 5,526,401 | A | | 6/1996 | Roach, Jr. et al. | 379/59 |
| 5,539,810 | A | | 7/1996 | Kennedy, III et al. | 379/59 |
| 5,544,225 | A | | 8/1996 | Kennedy, III et al. | 379/59 |
| 5,546,444 | A | | 8/1996 | Roach, Jr. et al. | 379/59 |
| 5,570,100 | A | | 10/1996 | Grube et al. | 364/446 |
| 5,579,376 | A | | 11/1996 | Kennedy, III et al. | 379/60 |
| 5,587,715 | A | | 12/1996 | Lewis | 342/357 |
| 5,594,650 | A | | 1/1997 | Shah et al. | 364/449.1 |
| 5,623,260 | A | | 4/1997 | Jones | 340/994 |
| 5,648,770 | A | * | 7/1997 | Ross | 340/994 |
| 5,652,707 | A | | 7/1997 | Wortham | 364/460 |
| 5,657,010 | A | | 8/1997 | Jones | 340/994 |
| 5,668,543 | A | | 9/1997 | Jones | 340/994 |
| 5,673,305 | A | | 9/1997 | Ross | 379/58 |
| 5,680,119 | A | | 10/1997 | Magliari et al. | 340/904 |
| 5,694,322 | A | | 12/1997 | Westerlage et al. | 364/464 |
| 5,699,275 | A | | 12/1997 | Beasley et al. | 364/514 R |
| 5,719,771 | A | * | 2/1998 | Buck et al. | 701/29 |
| 5,732,074 | A | | 3/1998 | Spaur et al. | 370/313 |
| 5,734,981 | A | | 3/1998 | Kennedy, III et al. | 455/445 |
| 5,736,940 | A | | 4/1998 | Burgener | 340/994 |
| 5,751,245 | A | | 5/1998 | Janky et al. | 342/357 |
| 5,760,742 | A | | 6/1998 | Branch et al. | 342/457 |
| 5,771,455 | A | | 6/1998 | Kennedy, III et al. | 455/456 |
| 5,774,825 | A | | 6/1998 | Reynolds | 364/449.7 |
| 5,796,365 | A | * | 8/1998 | Lewis | 342/357 |
| 5,799,263 | A | * | 8/1998 | Culbertson | 701/117 |
| 5,808,565 | A | | 9/1998 | Matta et al. | 340/994 |
| RE35,920 | E | | 10/1998 | Sorden et al. | 342/457 |
| 5,922,040 | A | * | 7/1999 | Prabhakaran | 701/117 |
| 5,945,919 | A | * | 8/1999 | Trask | 340/825.491 |
| 6,006,159 | A | | 12/1999 | Schmier et al. | 701/200 |
| 6,094,149 | A | | 7/2000 | Wilson | 340/904 |
| 6,097,317 | A | | 8/2000 | Lewiner et al. | 340/994 |
| 6,222,462 | B1 | | 4/2001 | Hahn | 340/904 |
| 6,240,362 | B1 | | 5/2001 | Gaspard, II | 701/209 |
| 6,253,146 | B1 | | 6/2001 | Hanson et al. | 701/202 |
| 6,618,668 | B1 | | 9/2003 | Laird | 701/200 |
| 2002/0069017 | A1 | | 6/2002 | Schmier et al. | 701/213 |
| 2002/0099500 | A1 | | 7/2002 | Schmier et al. | 701/200 |
| 2003/0098802 | A1 | | 5/2003 | Jones | 340/994 |

OTHER PUBLICATIONS

"Vehicle Location and Fleet Management Systems", IEE Colloquium, Computing and Control Division, Jun. 8, 1993.

The 3rd International Conference on Vehicle Navigation & Information Systems (VNIS) Norway, Sep. 2–4, 1992, pp. 312–315.

Preiss, George; Jenson, Lillian; "The Satref and GPS Information Projects", 1992 IEEE—3rd International Conference on Vehcile Navigation Information Systems, ppp. 648–655.

"Vehicle Navigation & Information Systems Conference Proceedings" (P–253), Society of Automotive Engineers, Inc., Oct. 1991, pp. 789–796.

"1992 Compendium of Technical Papers", Institute of Transportation Engineers—INRAD: A Deminostration of Two–Way Roadway to Vehicle Communication for use in Traffic Operations, Annual Meeting, Washington, D.C. pp. 214–218.

"Paving the Way for GPS in Vehicle Tracking", Showcase World, Dec. 1992.

"Advanced Vehicle Monitoring and Communication Systems for Bus Transit", Federal Transit Administration, Sep. 1991, Revised Mar. 1993.

Koncz, et al., "GIS–Based Transit Information Bolsters Travel Options", GIS World, Jul. 1995, pp. 62–64.

Helleker, Jan, Real–Time Traveller Information—in everyone's pocket?!—a pilot test using hand–portable GSM terminals, IEEE—IEE Vehicle Navigation & Information systems Conference, Ottawa, VNIS 1993, pp. 49–52.

Burgener, E.C., "A Personal Transit Arrival Time Receiver", IEEE—IEE Vehicle Navigation & Information Systems Conference, Ottawa, VNIS 1993, pp. 54–55.

Peng, Zhong–Ren, "A Methodology for Design for a GIS–Based Automatic Transit Traveler Information System", Computer, Environment and Urban Systems, vol. 21, No. 5, pp. 359–372, 1997.

Lessard, Robert, "The Use of Computer for Urban Transit Operations", IEEE—IEE Vehicle Navigation & Information systems Conference, Ottawa, VNIS 1993, pp. 586–590.

Sommerville, Fraser, et al., "Reliable Information in Everyone's Pocket—a Pilot Test", IEEE, vol. 1927, Mar. 1994, pp. 425–428.

"PROMISE—Personal Mobile Traveller and Traffic Information Service—Specification of Promise Services, Ver. 7", Telematics Application Programme A2, Transport, Jul. 1, 1996.

"PROMISE—Personal Mobile Traveller and Traffic Information Service—Generic Promise System Architecture, Ver. 2", Telematics Application Programme A2, Transport, Sep. 10, 1996.

PROMISE—Personal Mobile Traveller and Traffic Information Service—Summary of Promise Public Relation Activities, Ver. 1, Telematics Application Programme A2, Transport, Feb. 12, 1999.

"PROMISE"—A Personal Mobile Traveller and Traffic Information Service—Abstract, The Institution of Electrical Engineers, 1997.

Sommerville, Fraser, et al., "The Promise of Increased Patronage", The Institution of Electrical Engineers, 1993, pp. 3/1–3/4.

"Automatic Transit Location System", Washington State Department of Transportation, Final Report, Feb. 1996.

"Advanced Traveler Aid Systems for Public Transportation", Federal Transit Administration, Sep. 1994.

"Advanced Vehicle Monitoring and Communication Systems for Bus Transit: Benefits and Economic Feasibility", U.S. Department of Transportation, Urban Mass Transportation Administration, Sep. 1991.

Leong, Robert, et al., "An Unconventional Approach to Automatic Vehicle Location and Control for Urban Transit", IEEE 1989, pp. 219–223.

"1994 Vehicle Navigation & Information Systems Conference Proceedings", Yokahama, Japan, Aug. 31—Sep. 2, 1994, pp. 807–810.

"Vehicle Navigation & Information Systems Conference Proceedings—P–253, Part 2", Society of Automotive Engineers, Inc., Oct. 1991.

Vehicle Navigation & Information Systems—Conference Record of Papers presented at the 3$^{rd}$ Vehicle Navigation & Information Systems Conference 1992., Reso Hotel, Osio Plaza., pp. 49–52.

Nelson, J. Richard, "Experiences Gained in Implementing an Economical Universal Motorist System", , IEEE—IEE Vehicle Navigation & Information Systems Conference, Ottawa, VNIS 1993, pp. 67–71.

"The Cassiope/Eurobus Approach", IEEE—IEE Vehicle Navigation & Information Systems Conference, Ottawa, NVIS 1993, pp. 79–81.

Kihl, Mary, "Advanced Vehicle Location System for Paratransit in Iowa", IEEE—IEE Vehicle Navigation & Information Systems Conference, Ottawa, VNIS 1993, pp. 381–384.

Gault, Helen, et al., "Automatic Vehicle Location and Control at OC Transpo", , IEEE—IEE Vehicle Navigation & Information Systems Conference, Ottawa, VNIS 1993, pp. 596–600.

Vehicle navigation & Information System—Conference Record of Papers presented at the First Vehicle Navigation and Information Systems Conference (VNIS '89), Sep. 11–13, 1999, pp. 602–605.

Heti, Gabriel, "Travelguide: Ontario's Route Guidance System Demonstration", , IEEE—IEE Vehicle Navigation & Information Systems Conference, Ottawa, VNIS 1993, pp. A13–A18.

Jeffery, D.J., et al., "Advanced Traveller Information Systems in the UK: Experience from the Pleiades and Romanse Projects", , IEEE—IEE Vehicle Navigation & Information Systems Conference, Ottawa, VNIS 1993, pp. 309–313.

Sweeney, Lawrence, E., et al., "Travinfo: A Progress Report", 1994 Vehicle Navigation & Information Systems Conference Proceedings, Yokahama, Japan, Aug. 31—Sep. 2, 1994, pp. 315–320.

Shimamura, Yta, et al., "Combined Position Detection System for Pedestrian/Train Mode", 1994 Vehicle Navigation & Information Systems Conference Proceedings, Yokahama, Japan, Aug. 31—Sep. 2, 1994, pp. 603–606.

Zavoli, Walt, "Customer Location Services", 1994 Vehicle Navigation & Information Systems Conference Proceedings, Yokahama, Japan, Aug. 31—Sep. 2, 1994, pp. 613–617.

Tanaka, Yoshimi, et al., "Automatic Traffic Information Provision System Utilizing Facsimile and Telephone (Now Operating in Osaka), 1994 Vehicle Navigation & Information Systems Conference Proceedings", Yokahama, Japan, Aug. 31—Sep. 2, 1994, pp. 627–632.

McDonald, Mike, et al., "Romanse (Road Management System for Europe) Project", 1994 Vehicle Navigation & Information Systems Conference Proceedings, Yokahama, Japan, Aug. 31—Sep. 2, 1994, pp. A–11—A–14.

Scott III, Robert H., "Computer–Aided Dispatch,", 1998, pp. 46–50.

Moore, Rodney J., "Hold the Phone!", American Demographics, Ithaca, Jan./Feb. 1996, p. 68.

Delong, Jr., Edgar S., "Making 911 even better", Telephony, Dec. 14, 1987, pp. 60–63.

Bruzek, Frank J., "Class Calling Service—A Consumer Service Perspective", Globecom '85 IEEE Global Telecommunications Conference, Dec. 2–5, 1985, vol. 1 of 3, pp. 11.4.1–11.4.4.

Powell, R., et al., "Real Time Passenger Information System for the Romanse Project", Colloouin Digest—IEE, Boston, Sep. 1993, pp. 9/1—9/3.

Huber, Paul, "Public Transport Information Systems in Munich", Intelligent Transport Systems World Congress '95—Second Wold Congress on Intelligent Transport Systems, Yokohama, Japan., Nov. 9–11. 1995, pp. 2362–2366.

Ronez, Nicholas, et al, "GIS–Based Transit Information Bolsters Travel Options", GIS World, vol. 6, part 7, Jun. 1995, pp. 62–64.

Catling, Ian, et al., "TABASCO—Improving Transport Systems in Europe", Pacific Rim TransTech Conference, Jul. 30–Aug. 2, 1995, 995 Vehicle Navigation & Information Systems Conference Proceedings, Washington State Convention and Trade Center, Seattle, Washington, USA, pp. 503–507.

Dailey, D.J., "Demonstration of an Advance Public Transportation System in the Context of an IVHS Regional Architecture", Proceedings of the First World Congress on Applications of Transport Telematics and Intelligent Vehicle–Highway Systems, Nov. 30–Dec. 3, 1994, Paris, France, pp. 3024–3031.

Hubner, Paul, "Advance Public Transportation Information in Munich", International Conference on Public Transport Electronic Systems, Conference Publication No. 42, Jun. 1996.

Thompson, S.M., et al., "Exploiting Telecommunications to Delivery Real Time Transport Information", Road Transport Information and Control, Apr. 21–23, 1998, pp. 59–63, Conference Publication No. 454 IEE 1998.

Kaminitzer, David, et al., Driver Information Systems: Influencing your Route, IEE Seminar, Mar. 3, 1999, pp. 5/1–5/5.

"Board Cites ATC in Spokane Near Miss", Article in Aviation Week & Space Technology, Mar. 28, 1977, URL: http://www.aviationnow.com.

Shifrin, Carole A., "Gate Assignment Expert System Reduces Delays at United's Hubs", Article in Aviation Week & Space Technology, Jan. 25, 1988.

"United Airlines applies TI's advance technologies to improve gate management at major airports", Article in Business Wire, Inc., Nov. 19, 1987.

Musich, Paula, "Airline Designs Software to move planes, people; Unite Airline's use of Covia Corp.'s Open Systems Manager, Connectivity Section", Article in PC Week, Jun. 7, 1988, vol. 5, No. 23, p. C11.
Stoll, Marilyn, "Systems help Airlines Manage Gate Schedules; Connectivity Supplement", PC Week, Jul. 25, 1988, vol. 5, No. 30, p. C4.
Reddy, Shyamala, "Traveling LAN: United Airlines Networks Its Terminals", Article in The Local Area Network Magazine, Jan. 1990, vol. 5, No. 1, p. 108.
Fisher, Sharon, "Networked Airport Systems help Travelers find their way; United Airlines subsidiary Covia Corp. devices integrated network.", Article in Software Magazine, Mar. 15, 1990, vol. 10, No. 4, p. 31.
Henderson, Danna K., "Automation Takes aim at airports: the power of the networked PC is being unleashed on passenger handling and ramp activities worldwide.", Article in Air Transport Wold, Aug. 1990., vol. 27, No. 8, p. 52.
"United Airlines introduces United Cargo Plug I, a new cargo computer system to serve freight forwarders", Business Wire, Oct. 22, 1990.
Miller, Barry, "Special Report: Airline Equipment, Service Center", Aviation Week & Space Technology, Aug. 25, 1975, p. 51.
Lyon, Mark W., "Cargo Net Debate Splits Industry", Journal of Commerce, Specials, p. 4, Jul. 27, 1992.
Davies, I.L., et al., "Electronics and the Aeroplane", Proceedings of the Institution of Electrical Engineers, Paper No. 7604, delivered before the IEE Electronics Division, $29^{th}$ Oct. 1975.
"Global Niche", Flight International, Sep. 26, 1990.
"Real–Time Briefings", Aviation Week and Space Technology, Oct. 13, 1986.
Flanagan, Mike, et al., "Amelia Earhart—Mystery Still Clouds Soaring Achievements", Chicago Tribune, Jul. 5, 1987, Final Edition, p. 5, Tempo Woman.
"Official Airline Guides", Airports®, Nov. 20, 1990, Around Airports, vol. 7, No. 47, p. 485.
"Automation System Gains Acceptance", Aviation Week & Space Technology, Nov. 23, 1992, vol. 137, No. 21, p. 97.
Klass, Philip, "French Testing Ground–Derived' MLS", Aviation & Space Technology, Avionics, p. 56, Dec. 15, 1975.
"Forecast Realized for ATC System", Aviation & Space Technology, Mar. 17, 1975, Avionics, p. 168.
Henderson, Danna, et al., "Ionworks: America West Automates New Phoenix Terminal Fully Integrated System to Handle Customer–Service Demands (America West Airlines Inc) (Includes Related Article Automation of passenger Service at Airports)", Airport Transport World, May 1, 1991. vol. 62.
3 Pages from a web site search under http://mit.edu/afs/net.mit/edu/project/attic/usa–today/tech/37, Jun. 12, 2003.
"What's New in passenger Handling Equipment", Air Transport World, vol. 24, p. 62, Sep. 1987.
"Senator Urges Acceleration of Navstar", Aviation & Space Technology, Avionics p. 153, Oct. 3, 1983.
"AFSC Broadens Joint Program Efforts", Aviation & Space Technology, System Acquisition, p. 83, Jul. 19, 1976.
Herskovitz, Don, "GPS Insurance Antijamming the System; Brief Article", Journal of Electronic Defense, Dec. 1, 2000, No. 12, vol. 23, p. 41.
Hambly, Richard M., et al., "Aircraft Traffic Management on the Airport Surface Using VHF Data Link for CNS", IEEE AES Systems Magazine, Mar. 1995, pp. 9–13.
Berzins, G., et al., "INMARSAT: Worldwide Mobile Satellite Services on Seas, in Air and on Land", Space Technology, vol. 10, No. 4, pp. 231–237, 1990.
Jenney, L.L., et al., "Man as Manager of Automated Resources in an Advanced Air Traffic System", J. Aircraft, vol. 12, No. 12, Dec. 1975.
"Routing & Scheduling System improvements from RTSI; Routing Technology Software, Inc.; Product Announcement", Modern Brewery Age, vol. 43, No. 3, p. 11S, Jan. 20, 1992.
Yanacek, Frank, "Hitching to the stars; satellites for shipment tracking", Research Information Transportation Journals, Combined, No. 6, vol. 29, p. 16.
Stoll, Marilyn, "For on–the–road firms, hand–held terminals are pivotal. Connectivity", Research Information Transportation Journals, Combined, No. 34, vol. 5, p. C11.
"IBM and Hunt to Market New Truck Tracker; International Business Machines", J.B. Hunt Transport Services; Brief Article, No. 210, vol. 101, p. 4.
Klass, Philip J., "Two Carriers Plan Automatic Data Link", Aviation Week and Space Technology, Air Transport Section, May 23, 2977, p. 36.
"Data Link Evolved Over Three Decades", Aviation Week and Space Technology, Air Transport Section, May 23, 1977, p. 36.
Klass, Philip J., "American to Install Printers in Cockpits", Aviation Week and Space Technology, Avionics, Jul. 21, 1980, p. 56.
Lefer, Henry, "Computers on a boon to E&M, but at a price", Air Transport World, vol. 23, p. 53, Feb., 1986.
Donaghue, J.A., "Choice of Data Link Systems Expands as New Generation Hits the Market", Air Transport World, vol. 20, p. 58, Apr. 1983.
Klass, Philip J., "Digital Network Could Improve Aircraft Links to Operations, ATC", Aviation Week and Space Technology, International Air Transport Section, vol. 131, No. 21, p. 121, Nov. 20, 1989.
Board Cites ATC in Spokane Near Miss, Article in Aviation Week & Space Technology, Safety Section, Mar. 28, 1977, p. 59.
"Vicorp Interactive Systems", Aviation Daily, Aviation Suppliers Section, vol. 309, No. 17, p. 147.
Neumann, Dr. Horst, "ATC Concepts with Extensive Utilization of Automatic Data Processing", pp. 4–1 to 4–9; No Publication Information or Date Information Provided.
Maxwell, Robert L., "Automation Possibilities in Air Traffic Control", pp. 561–563, No Publication Information or Date Information Available.
"History of GPS", 3 pages, No Publication Information or Date Information Available.
"Road Transport Research—Intelligent Vehicle High Systems—Review of Field Trials", prepared by an OECD Scientific Expert Group, pp. 1–101, Organisation for Economic Co–Operation and Development—No Date Information Available.

Ratcliff, Robert, et al., Transportation Resources Information Processing System (TRIPS), pp. 109–113, No. Publication Information or Date Information Available.
Balke, Kevin,, et al., Collection and Dissemination of Real–Time Travel Time and Incident Information with In–Vehicle Communication Technologies, pp. 77–82, No Publication Information or Date Information Available.
Moriok, et al., "Advanced Vehicle Monitoring and communication Systems for Bus Transit—Benefits and Economic Feasibility", Final Report—U.S. Department of Transportation, Sep. 1991, Revised Mar. 1993, Dot–T–94–03.
Brynielsson, Thore, Step by Step Development Towards Attractive Public Transport, Chalmers University of Technology, Gotebord, Sweden, Department of Transportation, 1976.

* cited by examiner

SYSTEM AND METHOD FOR ACTIVATION OF AN ADVANCE NOTIFICATION SYSTEM FOR MONITORING AND REPORTING STATUS OF VEHICLE TRAVEL

CLAIM OF PRIORITY AND CROSS REFERENCE TO RELATED APPLICATIONS

This document claims priority to and is a continuation-in-part of U.S. patent application entitled "ADVANCE NOTIFICATION SYSTEMS AND METHODS UTILIZING A COMPUTER NETWORK," assigned Ser. No. 08/852,119, and filed on May 6, 1997, now U.S. Pat. No. 6,748,318 which claims priority to (a)–(d) hereafter, and which is a continuation-in-part of (b)–(d) hereafter:

(a) provisional application entitled, "ADVANCE NOTIFICATION SYSTEM AND METHOD UTILIZING A COMPUTER NETWORK," filed Mar. 7, 1997 by M. K. Jones and assigned Ser. No. 60/039,925;

(b) nonprovisional application entitled, "ADVANCE NOTIFICATION SYSTEM AND METHOD UTILIZING PASSENGER-DEFINABLE NOTIFICATION TIME PERIOD," filed May 2, 1995 by M. K. Jones and assigned Ser. No. 08/434,049, now U.S. Pat. No. 5,623,260 to M. K. Jones that issued on Apr. 22, 1997;

(c) nonprovisional application entitled, "ADVANCE NOTIFICATION SYSTEM AND METHOD UTILIZING VEHICLE PROGRESS REPORT GENERATOR," filed May 2, 1995 by M. K. Jones and assigned Ser. No. 08/432,898, now U.S. Pat. No. 5,657,010 to M. K. Jones that issued on Aug. 12, 1997; and (d) nonprovisional application entitled, "ADVANCE NOTIFICATION SYSTEM AND METHOD UTILIZING PASSENGER CALLING REPORT GENERATOR," filed May 2, 1995 by M. K. Jones and assigned Ser. No. 08/432,666, now U.S. Pat. No. 5,668,543 to M. K. Jones that issued on Sep. 16, 1997;

where documents (b), (c), and (d) are each a continuation-in-part of the application entitled "ADVANCE NOTIFICATION SYSTEM AND METHOD UTILIZING A DISTINCTIVE TELEPHONE RING, " filed Mar. 20, 1995 by M. K. Jones and assigned Ser. No. 08/407,319, now abandoned, which in turn is a continuation-in-part of an application entitled "ADVANCE NOTIFICATION SYSTEM AND METHOD" filed May 18, 1993 by M. K. Jones et al. and assigned Ser. No. 08/063,533, now U.S. Pat. No. 5,400,020 to M. K. Jones et al. that issued on Mar. 21, 1995. All of the foregoing applications and patents are incorporated herein by reference.

BACKGROUND OF THE INVENTION

1. Field of the Invention

The present invention generally relates to data communications and information systems and, in particular, to an automated activation system and method for efficiently activating a vehicle travel monitoring system.

2. Related Art

There are many situations when it is desirable to know the actual arrival time of a particular vehicle at a particular destination or other location. With this information, adjustments can be made to avoid waiting for a particular vehicle to reach the particular destination. For example, a person picking up a friend or relative at a commercial bus station usually either calls the bus station to find out the approximate arrival time (information which is oftentimes unavailable or unreliable) and/or arrives at the bus station prior to the scheduled arrival time of the bus hoping that the bus is not significantly delayed.

Another example involves school children that ride school buses. The arrival times of school buses at scheduled stops can be significantly affected by many factors such as maintenance problems, rush hour traffic, and congested urban/suburban conditions. As a result, school children typically wait at bus stops for long periods of time, oftentimes in adverse weather conditions, on unlit street corners, or in hazardous conditions near busy or secluded streets. A system informing the students of the school bus'proximity is desirable in order for the students to avoid waiting on the school bus at the school bus stop for extended times.

Yet another example is in the commercial overnight package delivery industry, wherein packages are delivered on a tight schedule. Customers oftentimes wait on delivery of important time-critical packages not knowing precisely when the delivery will occur. A system informing the customer of the precise arrival time is desirable in order to improve customer service and to allow the customer to better rely on the estimated arrival time of the delivery.

Thus, generally, it is desirable to know when a vehicle (such as a bus, truck, train, plane, user, or the like) is (a) a particular time period (for example, a certain number of minutes or seconds) away from arriving at a destination, (b) a particular distance (for example, number of feet or miles) away from the destination, or (c) at a particular location among a set of predetermined location points.

In order to alleviate the arrival time problem in the context of school buses, student notification systems in the past have been employed that use a transmitter on each bus and a receiver inside each student home. U.S. Pat. No. 4,713,661 to Boone et al. and U.S. Pat. No. 4,350,969 describe systems of this type. When the school bus and its on-board transmitter come within a certain range of a particular home receiver, the transmitter sends a signal to notify the student that the school bus is nearby. While such notification systems work satisfactorily under certain circumstances, nevertheless, these systems are limited by the range of the transmitters and require the purchase of relatively expensive receivers for each student. In addition, such systems provide little flexibility for providing additional information to the students, such as notifying them of the delayed arrival of a bus, alternative bus route information, or information regarding important school events.

Thus, a heretofore unaddressed need exists in the industry for a system and method for monitoring travel of a vehicle and for providing desirable travel information, such as, for example, an updated location of the vehicle. It would also be desirable that such a system allow users to automatically register with the system (i.e., to request the system to monitor a particular vehicle) in order to increase the efficiency of the system, and to make it more user friendly.

SUMMARY OF THE INVENTION

The present invention overcomes the inadequacies and deficiencies of the prior art as discussed herein. In general, the present invention provides an automated system and method for monitoring travel of a vehicle that can be efficiently activated by a user at a remote location.

In a broad sense, the present invention utilizes a first communications device, a second communications device, and a data manager. A user at a remote location establishes communication with the first communications device and transmits a vehicle indicator and a location indicator to the first communications device. The vehicle indicator identifies a particular vehicle, and the location indicator identifies a location along the vehicle's route of travel. The first communications device transmits the vehicle indicator and the location indicator to the data manager, and the data manager retrieves location data based on the location indicator. The data manager then correlates and compares the location data with travel data associated with the vehicle. The travel data indicates the current location of the vehicle, and the data manager transmits a message to the user via the second communications device, when the data manager determines that the vehicle is a predetermined proximity from the location identified by the location indicator.

The present invention has many advantages, a few of which are delineated hereafter, as mere examples.

An advantage of the present invention is that a particular vehicle associated with the system can be monitored, and a user can be notified when an arrival of the vehicle at a predefined destination is imminent. As a result, the user can prepare for the arrival of the vehicle knowing the precise time of arrival of the vehicle.

Another advantage of the present invention is that a user at a remote location can easily activate service for monitoring of a particular vehicle at a particular stop.

Another advantage of the present invention is that it can be implemented in software, hardware, or a combination thereof.

Another advantage of the present invention is that a request to monitor a vehicle can be automatically processed in a vehicle tracking system. In addition, the vehicle can be automatically monitored in response to the request.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
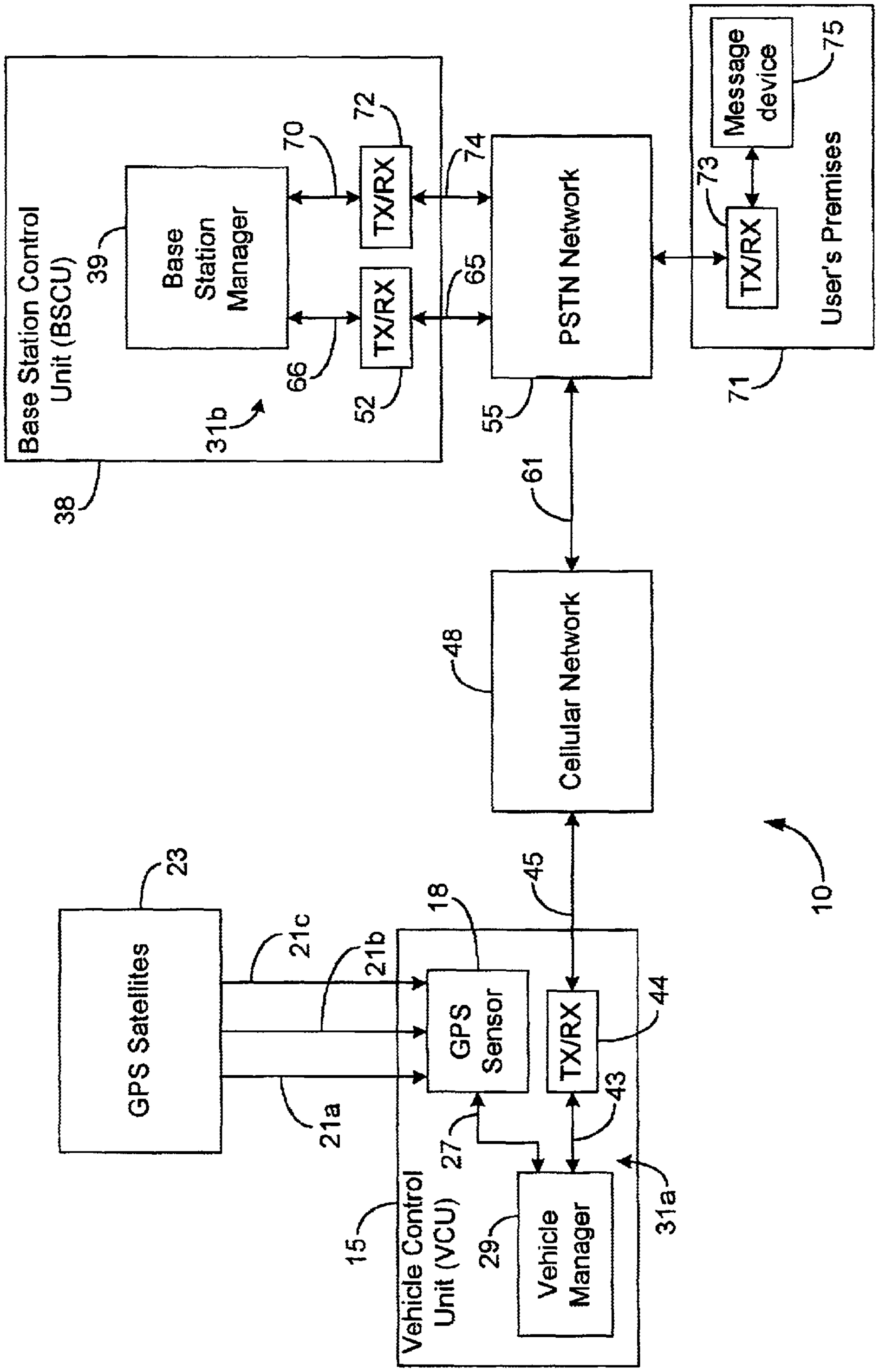
FIG. 1 is a block diagram illustrating a vehicle monitoring system in accordance with the preferred embodiment of the present invention.

FIG. 1 depicts an automated monitoring system 10 illustrating the principles of the present invention. Vehicle Control Unit (VCU) 15 can be attached to any mobile structure or vehicle capable of carrying or moving a sensor 18 over various distances. For example, VCU 15 can be attached to an automobile, an airplane, a train, a boat or any other structure capable of moving across or through the Earth's surface and/or atmosphere. VCU 15 can also be carried by a person while walking or running.

The sensor 18 within VCU 15 is configured to determine the location of VCU 15 relative to a predetermined reference point. For example, in the preferred embodiment, sensor 18 is a global positioning system (GPS) sensor coupled to VCU 15, although other types of positioning systems and/or sensors are also possible. The GPS sensor 18 is configured to receive signals 21*a*–21*c* from a plurality of GPS satellites 23, and as known in the art, sensor 18 is designed to analyze signals 21*a*–21*c* in order to determine the sensor's coordinate values relative to a predetermined reference point. For example, in the preferred embodiment where sensor 18 is a GPS sensor, the sensor 18 determines the sensor's coordinate values relative to the Earth's zero degree latitude and zero degree longitude reference point, which is located at the intersection of the Equator and the Prime Meridian. U.S. Pat. No. 5,781,156 entitled "GPS Receiver and Method for Processing GPS Signals" and filed on Apr. 23, 1997 by Krasner, which is incorporated herein by reference, discusses the processing of GPS signals 21*a*–21*c* received from GPS satellites 23 in order to determine the coordinate values. Since the sensor 18 is located within VCU 15, the coordinate values determined by the sensor 18 are assumed to match the coordinate values of the vehicle or other structure attached to the VCU 15.

It should be noted that the term "coordinate value" shall be defined herein to mean any value or set of values that may be used to determine a location of a point on the Earth. These values may be grid values, polar values, vector values, or any other type of value or values known in the art for indicating locations of points.

Sensor 18 is designed to transmit a signal 27 to vehicle manager 29 indicating the VCU's current coordinate values. Vehicle manager 29 is configured to receive signal 27 and to monitor the location of the VCU 15 over time by processing multiple signals 27. The vehicle manager 29 can be implemented in software, hardware, or a combination thereof. In the preferred embodiment, as illustrated by way of example in FIG. 2, the vehicle manager 29 of the present invention along with its associated methodology is implemented in software and stored in computer memory 30*a* of a computer system 31*a*.

Note that the vehicle manager 29 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the vehicle manager 29 may be magnetically stored and transported on a conventional portable computer diskette.

Figure 2:
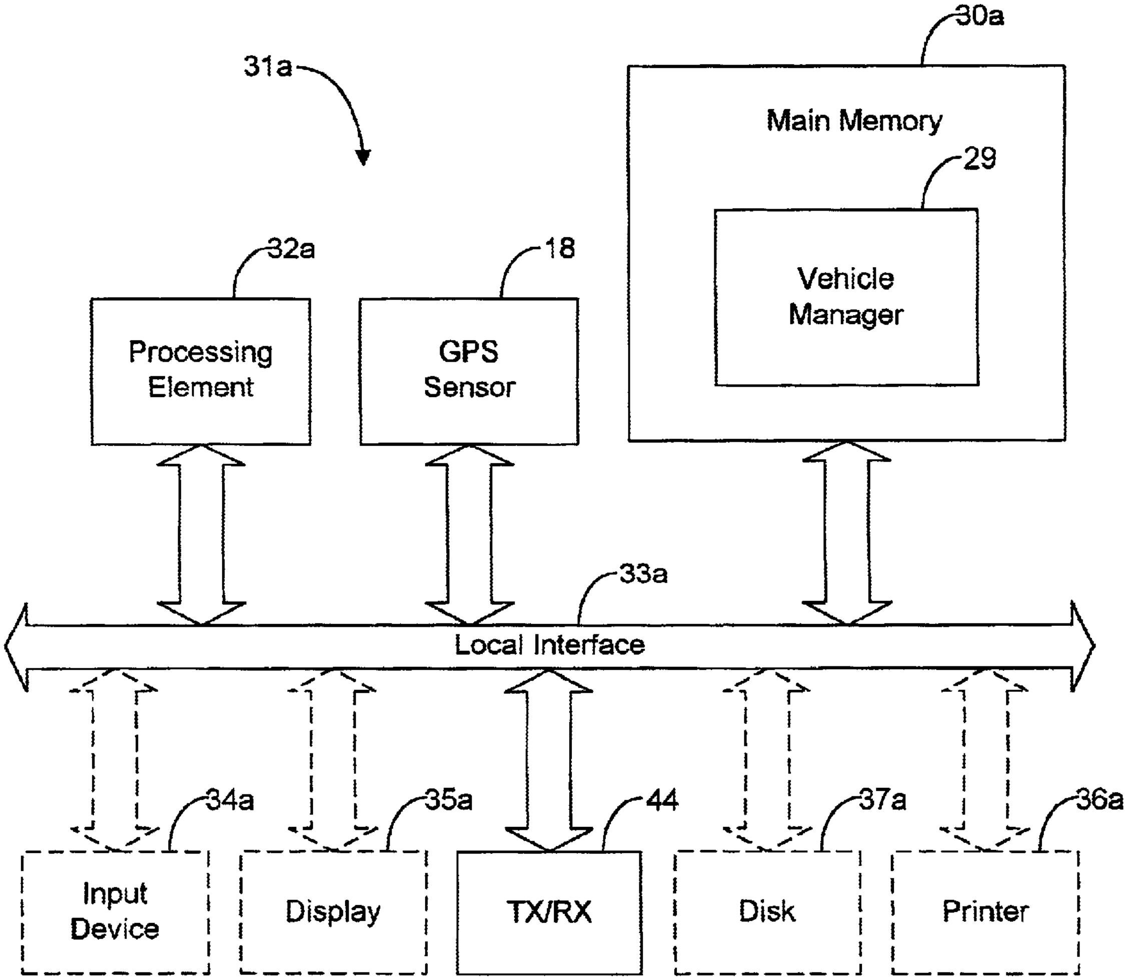
FIG. 2 is a block diagram illustrating an implementation of the vehicle manager of FIG. 1 in accordance with the preferred embodiment of the present invention.

The preferred embodiment of the computer system 31*a* of FIG. 2 comprises one or more conventional processing elements 32a, such as a digital signal processor (DSP), that communicate to and drive the other elements within the system 31*a* via a local interface 33*a*, which can include one or more buses. Furthermore, an input device 34*a*, for example, a keyboard or a mouse, can be used to input data from a user of the system 31*a*, and screen display 35*a* or a printer 35*a* can be used to output data to the user. A disk storage mechanism 37*a* can be connected to the local interface 33*a* to transfer data to and from a nonvolatile disk (e.g., magnetic, optical, etc.). It should be noted that input device 34*a*, display 35*a*, printer 35*a*, and disk 37*a* are optional and are not a part of the preferred embodiment, although other embodiments may include these features.

The vehicle manager 29 is preferably configured to maintain a database of travel data. The travel data includes the vehicle location information as well as any other desirable information. For example, when VCU 15 is attached to a delivery vehicle, vehicle manager 29 can be configured to include a list of items to be delivered and to indicate which deliveries have been successfully attempted, which deliveries have been unsuccessfully attempted, and which deliveries remain to be attempted. Vehicle manager 29 can also be configured to include the time that particular deliveries or other types of stops (e.g., bus stops) have been made and/or attempted. The travel data stored in vehicle manager 29 may include other desirable information not mentioned herein without departing from the principles of the present invention.

When desired, vehicle manager 29 is configured to transmit certain travel data (preferably including the location of VCU 15 and other desirable information) to Base Station Control Unit (BSCU) 38, which is remotely located from the VCU 15. Copending U.S. patent application entitled "System and Method for Enciphering and Communicating Vehicle Tracking Information" filed by Jones of even date herewith (Express Mail No. EL068353584 US), which is incorporated herein by reference, describes a system and method for transmitting the vehicle data to BSCU 38.

Figure 3:
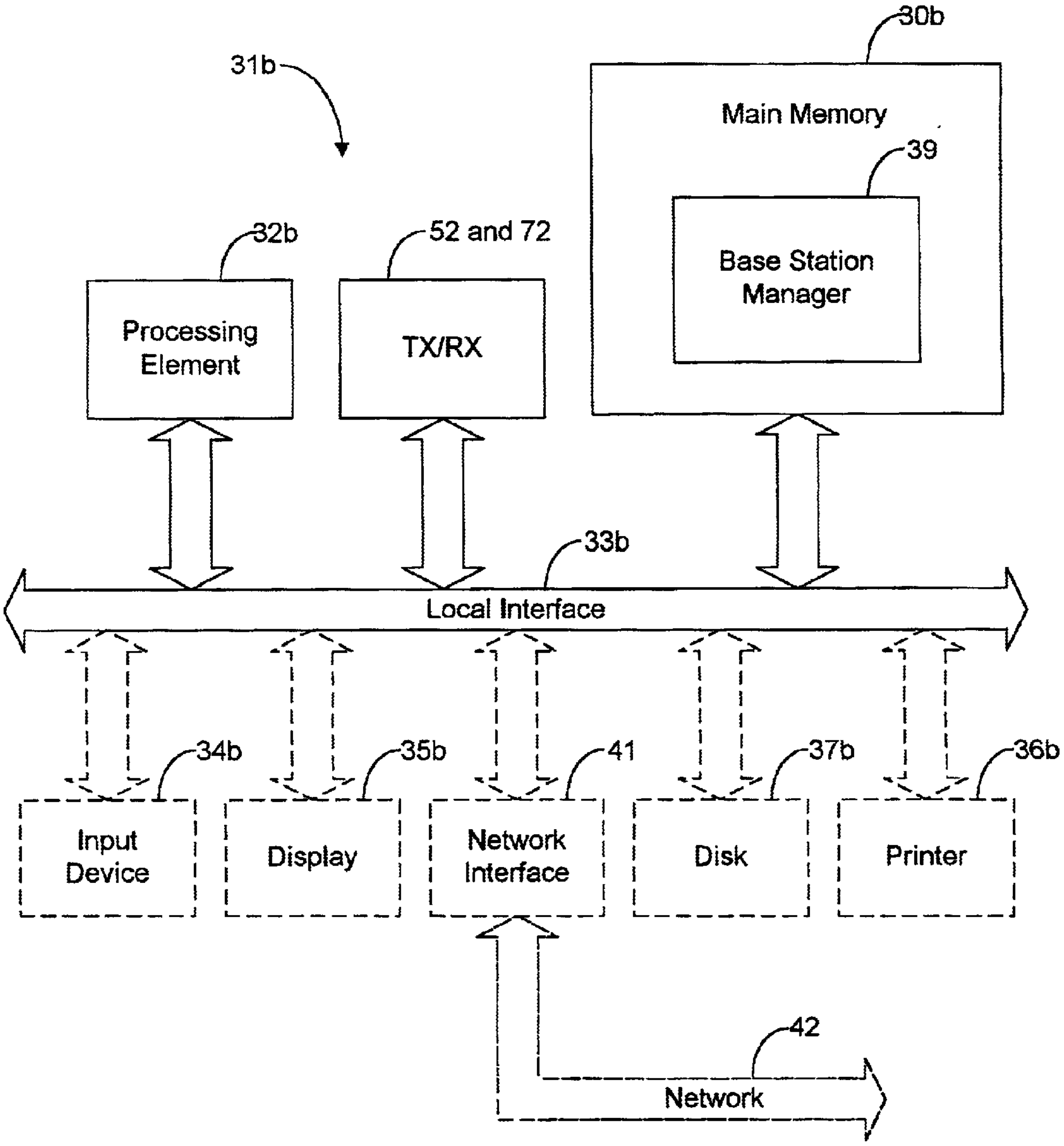
FIG. 3 is a block diagram illustrating an implementation of the base station manager of FIG. 1 in accordance with the preferred embodiment of the present invention.

BSCU 38 preferably includes a base station manager 39 designed to monitor the travel data of each VCU 15 associated with the system 10. The base station manager 39 can be implemented in software, hardware, or a combination thereof. In the preferred embodiment, as illustrated by way of example in FIG. 3, the base station manager 39 of the present invention along with its associated methodology is implemented in software and stored in computer memory 30*b* of a computer system 31*b*. The computer system 31*b* can be similar to computer system 31*a*, as can be seen by comparing FIG. 2 to FIG. 3. In this regard, the computer system 31*b* may include memory 30*b* for storing monitoring mechanism 39, and the computer system 31*b* may also include processing element 32*b*, local interface 33*b*, input 34*b*, display 35*b*, printer 36*b*, and storage disk 37*b*. It may also be desirable for computer system 31*b* to include a network interface 41 that allows the system 31*b* to exchange data with a network 42. It should be noted that input device 34*b*, display 35*b*, printer 36*b*, disk 37*b*, network interface 41, and network 42 are optional.

Vehicle manager 29 is configured to transmit travel data, via signal 43 (FIG. 1), to a communications device 44, which is capable of transmitting and receiving data to and from devices outside of VCU 15. In this regard, communications device 44 is preferably a cellular modem configured to transmit and receive wireless signals to and from a cellular network 48.

The communications device 44 can transmit the travel data over the voice channels associated with the cellular network 48, as is done by most cellular modems of the prior art. However, in order to reduce the cost associated with transmitting the travel data through the cellular network 48, the travel data may be communicated through the cellular network 48 via a data or control channel. In this regard, the travel data can be encoded by altering indentifiers of communications device 44, such as the mobile identification number (MIN) or electronic serial number (ESN), transmitted over a data channel of the cellular network 48. Alternatively, travel data can be appended to a feature request transmitted over the data channel. U.S. Pat. No. 5,771,445 entitled "Data Messaging in a Communications Network using a Feature Request," filed on Dec. 15, 1995, by Kennedy, III, et al., and U.S. Pat. No. 5,546,444 entitled "Methods and Apparatus for Communicating Data Via a Cellular Network Control Channel" filed on Mar. 11, 1994, by Roach, Jr., et al., which are both incorporated herein by reference, discuss the transmission of travel data over a data or control channel associated with cellular network 48 in further detail.

In order to transmit the travel data through a data channel by manipulating identifiers of the communications device 44, the MIN of communications device 44 is altered to include travel data, but the ESN remains fixed to be used as an identifier of the communications device 44. Therefore, after transmitting the identifiers through the data channel, the communications device 44 can be identified by the ESN, and the travel data can be determined from the MIN. Alternatively, the ESN of communications device 44 can be altered while the MIN is kept constant. It should be understood that the invention contemplates modification of the MIN, ESN, both the MIN and ESN, or other identifiers of the communications device 44 to accomplish the dual task of transmitting travel data and identifying the communications device 44.

Alternatively or in combination with the manipulation of the identifiers of the communications device 44, travel data can be communicated through the data channel by appending travel data to feature requests that are transmitted through the data channel. In this regard, most feature requests are generated by automatically or manually dialing the star key ("*") followed by a two-digit feature request identification code, and 29 digits of data. Therefore, for each feature request generated, 29 digits of travel data can be appended to the two-digit feature request identification code and sent over the data channel of the cellular network 48. Other embodiments may transmit different amounts of travel data following the feature request. By utilizing the manipulation of identifiers or the appendage of travel data to feature requests, less data is transmitted through the voice channels of the cellular network 48, thereby reducing the cost of transmitting data through the cellular network 48.

Cellular network 48 is designed to transmit the travel data to a vehicle communications device 52 at the BSCU 38. Although not necessary for implementation of the present invention, cellular network 48 is preferably designed to transmit to vehicle communications device 52 via a public switched telephone network (PSTN) 55. In this regard, PSTN 55 establishes a link between communications device 52 and cellular network 48, whereby cellular network 48 and communications device 52 can communicate via signals 61 and 65. Therefore, communications device 52 is preferably designed as a PSTN modem capable of communicating signals 65 between base station manager 39 and PSTN network 55.

Although the preferred embodiment utilizes a cellular network 48 and a PSTN network 55 to communicate travel data to base station manager 39, one ordinarily skilled in the art should realize that other configurations are possible. For example, communications device 52 can be configured as a cellular modem capable of communicating signals directly with cellular network 48. Alternatively, utilization of communication networks 48 and 55 can be completely circumvented by configuring communications device 44 to communicate directly with communications device 52, for example. Any embodiment capable of communicating data between vehicle manager 29 and base station manager 39 should be suitable for implementing the principles of the present invention.

Base Station Manager

Figure 4:
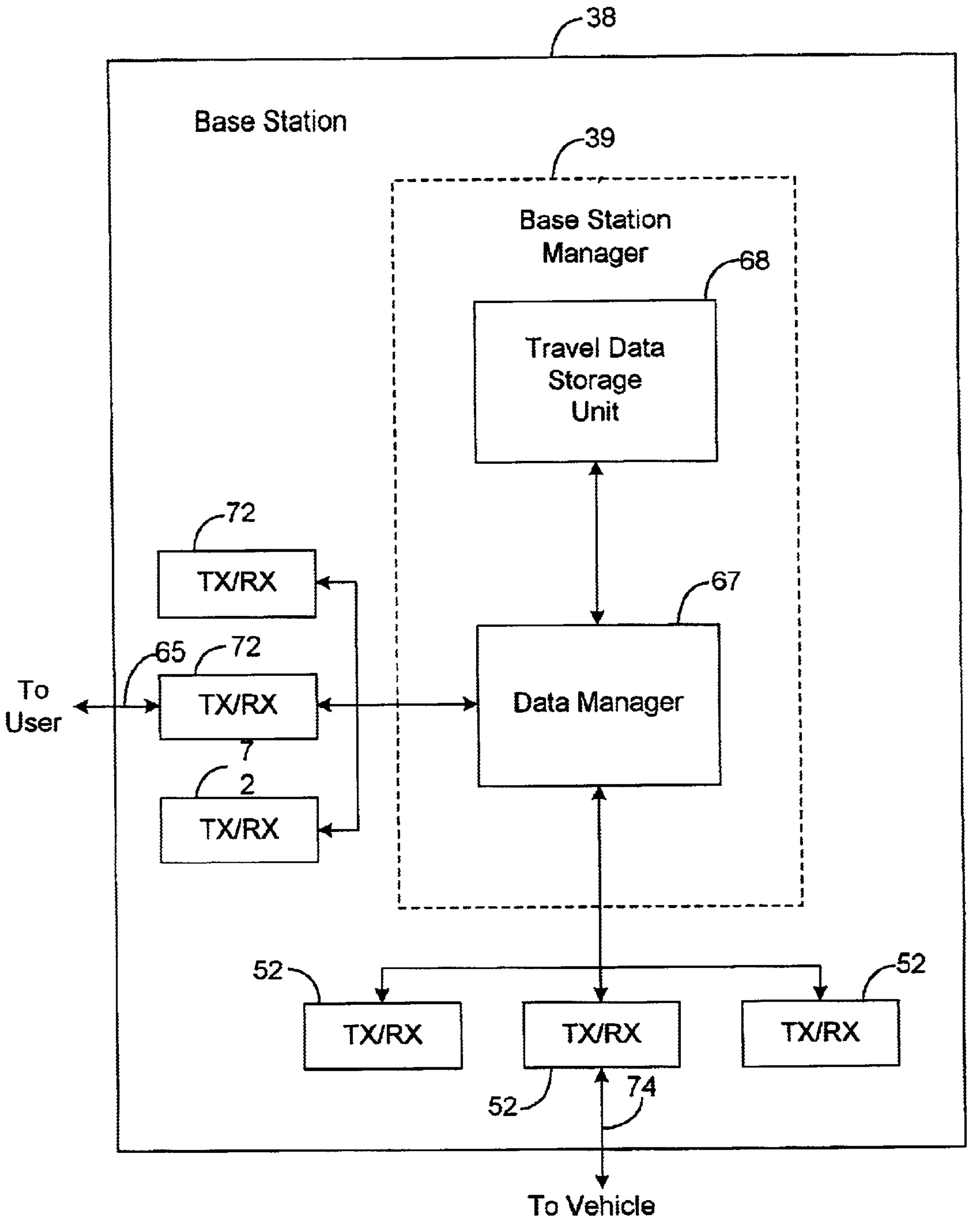
FIG. 4 is a detailed block diagram of the base station of FIG. 1.

Base station manager 39 is designed to receive the travel data transmitted from vehicle manager 29 and to monitor the travel of the vehicle attached to the VCU 15 by monitoring the travel of the VCU 15. In this regard, base station manager 39 is designed to include a data manager 67 configured to receive the travel data via signal 66 from communications device 52, as depicted by FIG. 4. Data manager 67 is designed to store the travel data for each VCU 15 being monitored into a travel data storage unit 68. Preferably, travel data storage unit 68 is a database configured to store travel data associated with each VCU 15 being monitored by the system 10. The travel data storage unit 68 is configured to include a relational parameter (i.e., a unique identification value correlated with the VCU 15 and, therefore, the travel data associated with the VCU 15) that enables determination of which travel data is associated with which VCU 15. For example, travel data storage unit 68 can be configured as a data table with each entry in the data table assigned an identification number unique to a particular VCU 15. Furthermore, each entry can include all of the travel data associated with the particular VCU 15. For example, each entry can include information such as, but not limited to, the VCU's coordinate values (i.e., the VCU's 15 location relative to a predetermined reference point), information regarding delivery status of items to be delivered, and/or the times that the VCU 15 reached particular locations or stops. The travel data storage unit 68 can be configured to contain all of the desirable information to monitor the status of each VCU 15 associated with the system 10.

Figure 5:
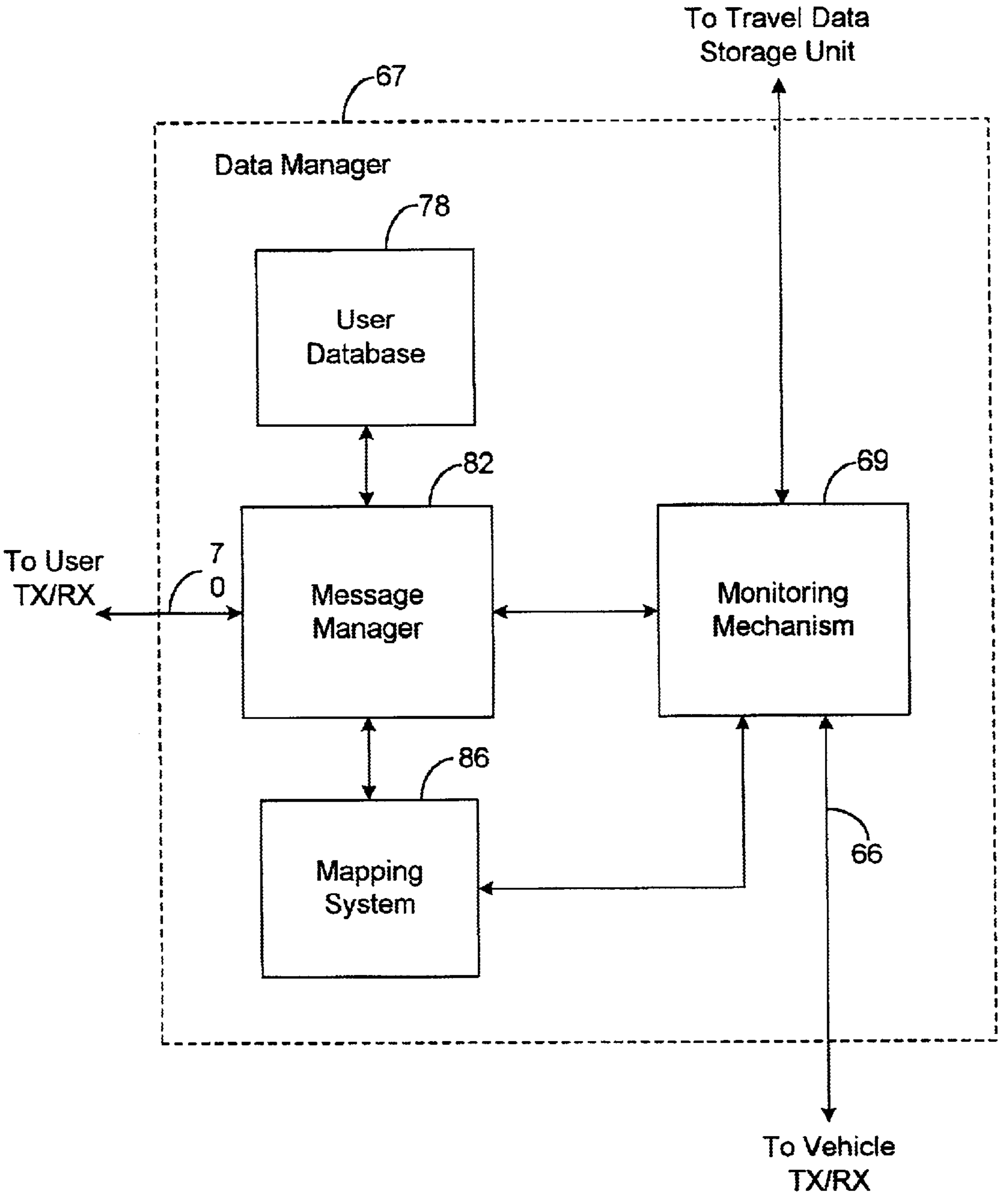
FIG. 5 is a detailed block diagram of the data manager of FIG. 4.
Figure 6:
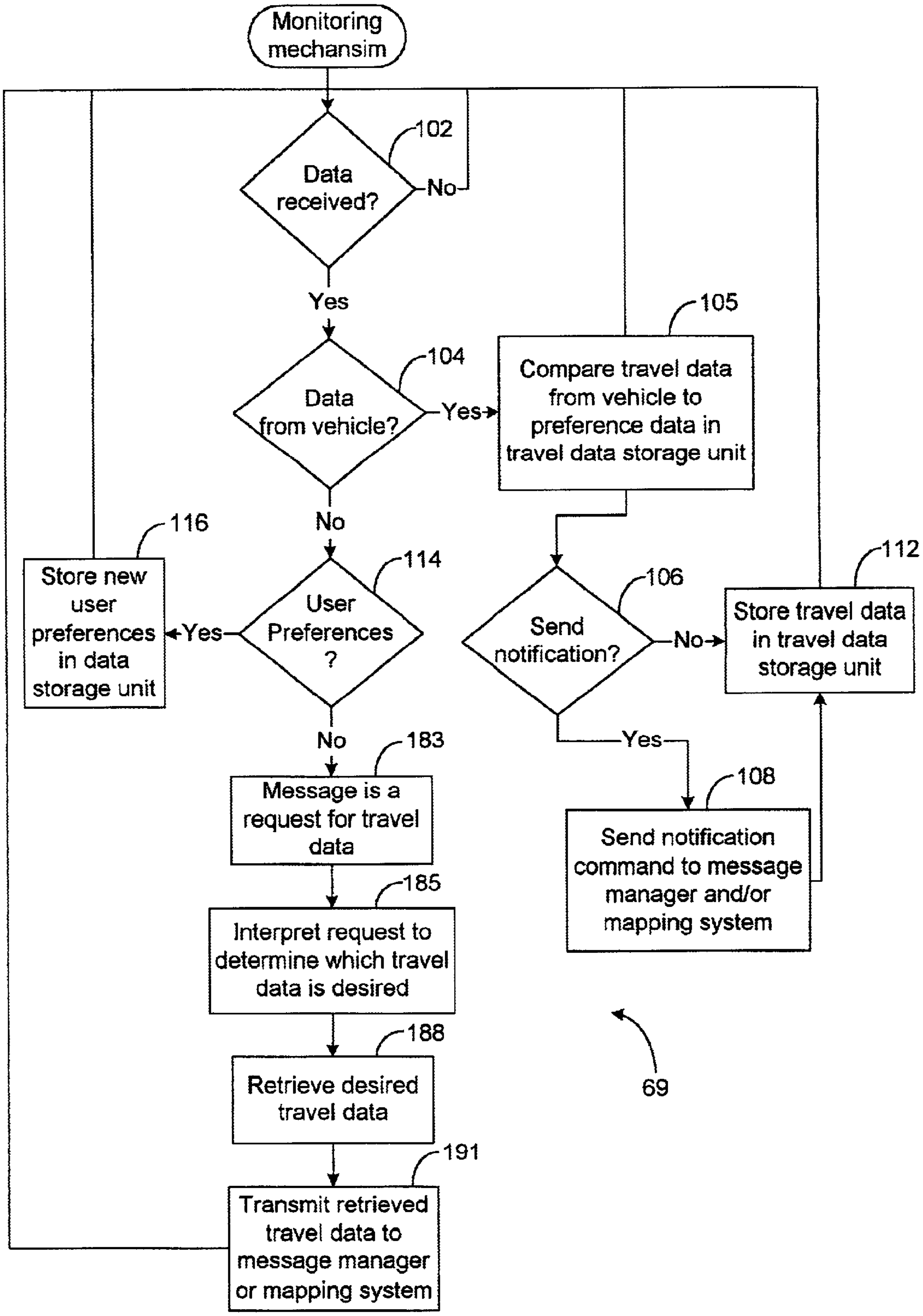
FIG. 6 is a flowchart illustrating the functionality of the monitoring mechanism of FIG. 5.

Referring to FIG. 5, data manager 67 is configured to include a monitoring mechanism 69. The functionality of monitoring mechanism 69 is depicted in FIG. 6. As shown by blocks 102–112 of FIG. 6, monitoring mechanism 69 is configured to receive travel data from VCU 15 and to compare the travel data with predefined preference data stored in travel data storage unit 68. Preference data, as used herein, is data that defines the preferred parameters indicating when to notify a user of the impending arrival of the VCU 15 at a particular location. For example, preference data can be coordinates of a desired location whereby a notification message is sent to a user when the coordinates of the VCU 15 pass the coordinates of the desired location. In this context, the desired location defined by the preference data can, for example, represent a location that is a predetermined distance from the user's house, place of delivery/pick-up, or other particular location. Therefore, when the user receives the notification message, the user is aware of the approximate location of the VCU 15 or of the distance of the VCU 15 from a predetermined point (i.e., of the proximity of the VCU 15 from a predetermined point or location). Consequently, the user can prepare for the arrival of the VCU 15, since the user knows that arrival of the VCU 15 is imminent.

Alternatively, the preference data can define a certain time before the VCU 15 reaches a destination or other particular location (i.e., a proximity of the VCU 15 from the predetermined point). In this regard, the monitoring mechanism 69 is designed to determine the location of the VCU 15 from the travel data stored in travel data storage unit 68. The monitoring mechanism 69 is then designed to calculate the time it will take for the VCU 15 to reach the location specified by the preference data based on the location of the VCU 15 and the location of the desired destination. In calculating the travel time, the monitoring mechanism 69 can be configured to make assumptions about the time necessary to travel to the specified location. For example, if the route of the VCU 15 is through congested areas, the monitoring mechanism 69 can assume a certain delay time for traveling certain distances, and if the route of the VCU 15 is through less congested areas, the monitoring mechanism 69 can assume another delay time that is less than the delay time assumed for the congested areas. Alternatively, the monitoring mechanism 69 can use an average of the times it has previously taken for VCUs 15 to travel over the same route during other deliveries. Therefore, by comparing the travel data transmitted from VCU 15 with preference data, the monitoring mechanism 69 can determine when to send a notification message to a user.

As depicted by blocks 102, 104, 114, and 116 of FIG. 6, the preference data can be stored in travel data storage unit 68 (FIG. 5). As stated hereinbefore, the travel data storage unit 68 is preferably configured to store the travel data associated with each VCU 15 in a respective entry uniquely identified with the associated VCU 15. Each data entry can also include the preference data associated with the VCU 15 that corresponds with the entry, or the preference data can be stored in separate entries which are correlated with corresponding VCU entries (i.e., the entries including the travel data of the VCU 15).

Once the monitoring mechanism 69 determines that a notification message should be sent to a user, the data manager 67 is designed to communicate a message to a user at a remote location 71, such as a user's premises, via PSTN network 55 and communications devices 72 and 73 (FIGS. 1, 4, and 5). In this regard, communications devices 72 and 73 are preferably PSTN modems capable of communicating with PSTN network 55. Data manager 67 is designed to transmit the message as signal 70 to user communications device 72, which communicates the message with PTSN network 55 via signal 74. PTSN network 55 then communicates the message to communications device 73, which is preferably configured to communicate the message to a message device 75. Message device 75 is configured to notify the user of the impending arrival of the VCU 15.

Preferably, message device 75 is a computer capable of displaying the notification through e-mail or some other communications software. Alternatively, message device 75 can be a telephone, a pager or any other device capable of notifying a user at location 71.

Although the preferred embodiment utilizes a PSTN network 55 to communicate a notification message to message device 75, one ordinarily skilled in the art should realize that other configurations are possible. For example, other communication networks can be utilized or utilization of communication networks can be completely circumvented by configuring communications device 72 to communicate directly with communications device 73. Any embodiment capable of communicating data between data manager 67 and message device 75 should be suitable for implementing the principles of the present invention.

User Activation

In order for data manager 67 to transmit a notification message to a user at user premises 71, data manager 67 should be aware of certain contact information enabling data manager 67 to contact the message device 75. In this regard, data manager 67 is configured to include a user database 78 (FIG. 5) containing contact information pertaining to each user that is to receive a notification message from the data manager 67. The user database 78 is preferably a database capable of uniquely identifying each user of the system 10. In the preferred embodiment, the user database 78 is a data table having entries that specify contact information associated with each user. Each entry preferably includes a user identification number unique to each user that identifies the information in the entry as relating to a particular user.

Each entry preferably includes a value specifying the medium through which the user has specified to be contacted. For example, the value can indicate that the user is to be contacted through e-mail, in which case the entry should also include the user's e-mail address. Alternatively, the value can indicate that the user is to be contacted through a telephone call or a page. In these situations, the entry should also include the user's telephone number or pager number. The value can also indicate multiple methods of notification. For example, the value can indicate that the user is to be first contacted via telephone. If there is no answer when the data manager 67 attempts to deliver a notification message, then the data manager 67 can be configured to attempt notification via paging. If paging fails, then the data manager 67 can be configured to attempt notification through e-mail or other computer oriented messaging system. Accordingly, the order of notification media should be indicated by the data in the user database 78, and the contact information necessary for each method selected (e.g., the telephone number, pager number, and e-mail address of the user) should also be included in the entry. It should be noted that various other communications media and combinations of communications media can be employed without departing from the principles of the present invention.

The contact information (and preference data, which will be discussed in further detail hereinafter) can be manually entered or downloaded into the user database 78 in order to activate a user for the system 10. In this regard, a system operator can receive the contact information (and preference data) via a telephone call or e-mail, for example, and manually enter the information into the system 10.

However, in the preferred embodiment, the contact information is automatically entered into the user database 78 via a message manager 82, which is depicted by FIG. 5. The functionality of the message manager 82 is shown in FIG. 7.

Figure 7:
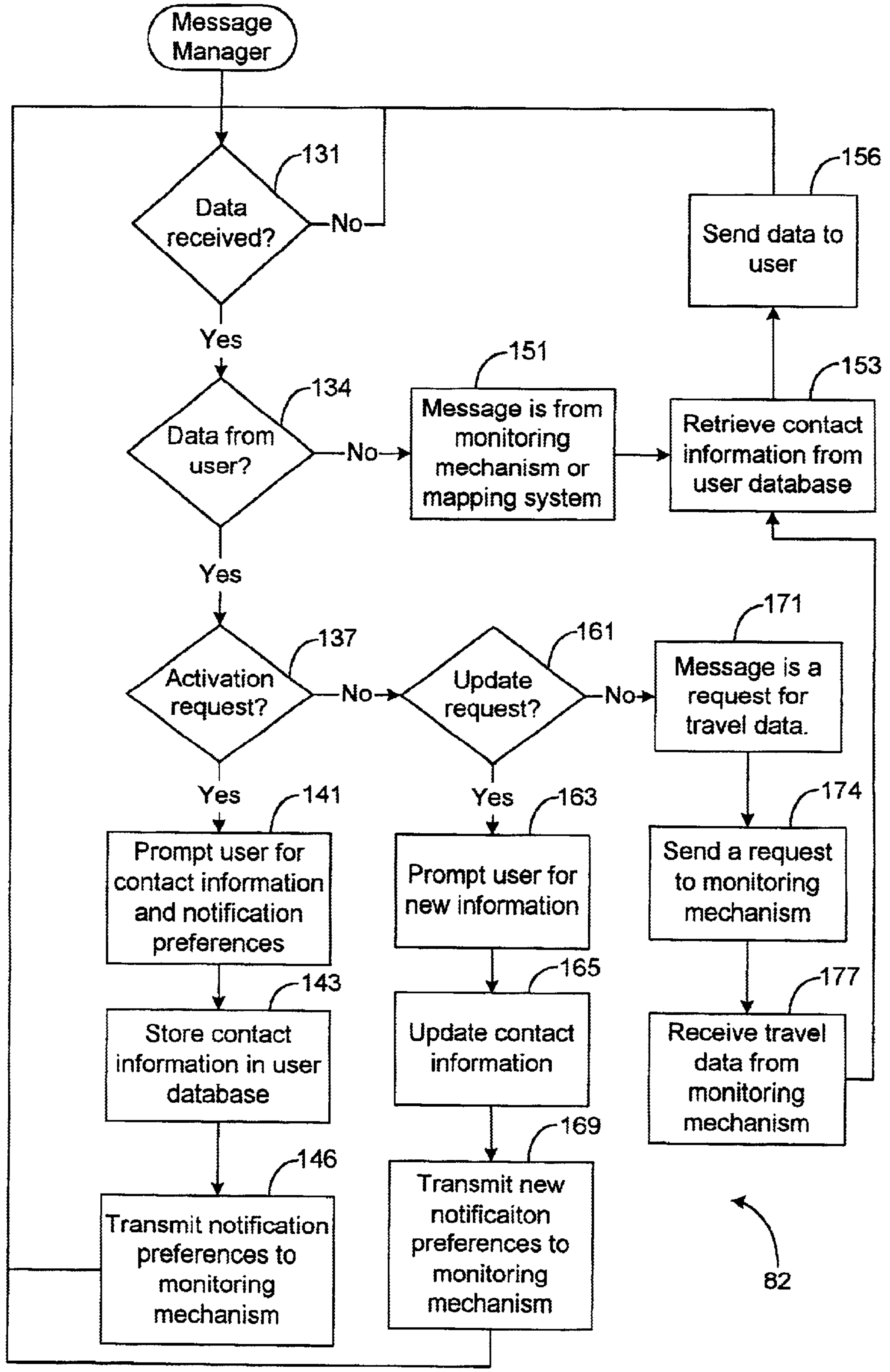
FIG. 7 is a flowchart illustrating the functionality of the message manager of FIG. 5.

The message manager 82 (FIG. 5) is configured to receive, via communications device 72 (FIG. 1), an activation request from a user at user premises 71, as shown by blocks 131–137 of FIG. 7. In this regard, the request can be transmitted to user communications device 72, via any suitable technique known in the art, and the BSCU 38 can be configured to include a plurality of user communications devices 72, as depicted by FIG. 4.

Each of these user communications devices 72 can be configured to simultaneously communicate with a respective user of the system 10. The information received by the user communications devices 72 can be transmitted to message manager 82 (FIG. 5) via any suitable technique, such as time division multiplexing, for example. Each user communications device 72 can also be designed to communicate with different communications media. For example, one user communications device 72 can be designed as a modem to communicate with a modem at user premises 71. This user communications device 72 can be designed to send data configured to prompt the user to return data pertaining to contact information. An example of such a prompt, could be a template or web page where the user's message device 75 (i.e., a computer in this case) displays the template, and the user can fill in fields of the template with the appropriate contact information. Alternatively, another one of the user communications devices 72 can be designed to receive a telephone call from a user at user premises 71 and to prompt the user to enter data through touch-tone signaling. Other user communications devices 72 can be designed to communicate with other types of communications media known in the art.

Once the message manager 82 (FIG. 5) receives the request from the user, the message manager 82 is designed to determine that the request is a request for activation (i.e., a request for the user to be entered into the system 10). In response, the message manager 82 transmits data to the user, via user communications device 72, in order to prompt the user to transmit the necessary contact information, as shown by block 141 of FIG. 7. In this regard, the message manager 82 is configured to determine the type of medium used by the user to communicate the request for activation and to transmit a prompt to the user that is compatible with this medium. For example, when the user is communicating via a modem, the message manager 82 is configured to transmit signals compatible with the user's modem in order to prompt the user to enter the appropriate contact information. This data could be in the form of a web page transmitted through the Internet, or the prompt could simply be messages transmitted through e-mail or some other data communications system.

When the user is communicating via a telephone, the message manager 82 is preferably designed to transmit recorded messages to the user. The user can then select or enter data by transmitting touch-tone signals in response to the prompting messages, as is commonly known in the art. The message manager 82 may be configured to communicate with the user in other formats and media known in the art.

Once the message manager 82 receives the contact information from the user, the message manager 82 is designed to store the contact information as an entry in the user database 78, as depicted by block 143 of FIG. 7. When the monitoring mechanism 69 determines that a user should be notified of an impending arrival of a VCU 15, the monitoring mechanism 69 is designed to send a notification command to message manager 82. The notification command may include travel data to be sent to the user, such as data indicating that a particular vehicle is a certain proximity from the destination defined by the preference data. In response, the message manager 82 is designed to retrieve the contact information associated with the user from the user database 78 and to determine how to contact the user based on the retrieved contact information, as depicted by blocks 151 and 153 of FIG. 7.

The message manager 82 is then designed to transmit a message compatible with the medium previously selected by the user for notification, as depicted by block 156 of FIG. 7. The message can include any travel data sent to the message manager 82 from the monitoring mechanism 69. For example, when the contact information indicates that a phone call is the preferred medium for notification, the message manager 82 can send a recorded telephone message to the telephone number that is indicated by the contact information retrieved from the user database 78. If the monitoring mechanism 69 included travel data indicating the time of arrival in the command to message manager 82, then message manager 82 can be configured to include a message indicating the expected time of arrival at a particular location. Alternatively, the same information can be sent via e-mail, facsimile, page or other type of communications medium to the user, depending on the preferences selected by the user during activation.

During activation, the message manager 82 can be further configured to prompt for and receive preference data (i.e., data pertaining to when the user is to be notified) from the user, as shown by block 141 of FIG. 7. In this regard, the message manager 82 can be designed to prompt the user to return information indicating which VCU 15 is to be monitored on behalf of the user and when the notification is to be sent to the user. For example, the user can be prompted to select a VCU 15, a destination (or other particular location), and a notification preference to indicate a time or distance that the VCU 15 should be from the selected destination or other particular location when a notification is to be sent to the user. In response, the user specifies, through any known suitable communications technique, which VCU 15 the user wishes the system 10 to monitor and how the user wishes to be notified of an impending arrival of the selected VCU 15 at the selected destination. If the user knows the coordinate values of the destination, the user can simply transmit the coordinate values to the data manager 67. If the user selects the destination without supplying the coordinates of the destination (e.g., the user selects a destination from a list of locations) then the data manager 67 is preferably designed to determine the coordinate values transparently.

In many instances, the user knows the stop number and vehicle number used by the system 10 to track a VCU 15. For example, when the VCU 15 is attached to a bus or other type of vehicle that makes scheduled stops, the stop numbers of the bus and the bus number are typically known by users of the system 10. Therefore, the message manager 82 is preferably configured to prompt the user to enter the bus number and stop number. In response, the user can simply transmit the bus number of the vehicle the user wishes to ride and the stop number of the bus stop where the user wishes to be pickup up. When the user has contacted the base station manager 39 via telephone, the user can simply transmit the numbers through touch tone signals. Circuitry within message manager 82 is preferably designed to detect the touch tone signals and to determine the requested bus number and stop number. Therefore, when the user is requesting bus service, the user can simply call the base station manager 39 and, after establishing the necessary contact information, enter via touch tone signaling the publicly available bus number and stop number of the desired bus and the desired bus stop.

As depicted by block 146 of FIG. 7, the message manager 82 is preferably designed to automatically transmit to monitoring mechanism 69 the preferences selected by the user that pertain to when the user is to be notified. Therefore, in the example where the user is requesting bus service, the message manager 82 is designed to transmit to the monitoring mechanism 69 an identification number unique to the current user, the bus number entered by the user, the stop number entered by the user, and the data entered by the user indicating when the user wishes to be notified of the impending arrival of the selected bus at the selected bus stop.

Preferably, the travel data storage unit 68 includes a data table that correlates stop numbers with GPS coordinate values. Therefore, using the stop number entered by the user, the monitoring mechanism 69 is configured to automatically retrieve from the travel data storage unit 68 the coordinate values of the bus stop requested by the user. The monitoring mechanism 69 then automatically stores the user identification number, the bus number entered by the user, and the coordinate values of the bus stop number entered by the user as an entry in the travel data storage mechanism 68. As a result, the user is registered with the system 10, and when the VCU 15 associated with the bus number entered by the user is within a predetermined distance or time of the selected bus stop, the base station manager 39 is configured to send a notification to the user. The method of notification depends on the contact information entered by the user and stored in user database 78.

Once a user becomes activated with the system 10, the user may make changes to the preferences specified by the user, as shown by blocks 161–169 of FIG. 7. The message manager 82 is configured to receive the request for changes from the user. The message manager 82 can be configured to request the user to resubmit all preferences, as updated, or can be configured to request the user to only submit desired changes to the preferences. After receiving the new data, the message manager 82 is configured to update the contact information in user database 78 and to send a request to monitoring mechanism 69 to update the preferences relating to the monitoring of travel data. In response, monitoring mechanism 69 is designed to update the preference data in the travel data storage unit 68, as shown by blocks 114 and 116 of FIG. 6.

It should be noted that the above example is described in the context where VCU 15 is attached to a bus for illustrative purposes only. In this regard, VCU 15 may be attached to other types of vehicles without departing from the principles of the present invention. Furthermore, other types of indicators (including numeric, alphanumeric, and/or other types of indicators) may be used to identify the VCU 15 and/or the location submitted with the preference data.

It should be further noted that as described hereinabove, the preference data and the travel data can be automatically received and stored in travel data storage unit 68 and selected VCUs 15 can be automatically monitored by the system 10. As used herein, the term "automatic" shall be defined to mean without interruption or intervention from a human operator. However, it is possible to implement the system 10 such that intervention or interruption from a human operator is required.

Requests for Travel Data

In addition to providing the user with automatic advance notification of an impending arrival of a VCU 15, the system 10 can also be used to provide the user with travel data on demand, as depicted by blocks 171–177, 153 and 156 of FIG. 7. In this regard, the user communications device 72 is designed to receive a request for travel data from a user. For example, the user may call the communications device 72 on a telephone and through touch-tone signaling select, among other options, an option to discover the distance and/or time a particular VCU 15 is from the destination specified by the user's preference data or specified by the user during the request for travel data. The user communications device 72 is designed to transmit the user's selections to message manager 82. Based on the selections, the message manager 82 is designed to determine that the user message is a request for travel data. In response, the message manager 82 sends a request to monitoring mechanism 69 to retrieve the requested data from travel data storage unit 68.

The monitoring mechanism 69 is designed to receive the request for travel data from message manager 82 and to interpret the request in order to determine which travel information from the travel data in travel data storage unit 68 is desired by the user, as depicted by blocks 183 and 185 of FIG. 6. The monitoring mechanism 69 is then designed to retrieve from travel data storage unit 68 the desired travel data and to transmit the retrieved travel data to message manager 82, as shown by blocks 188 and 191 of FIG. 6.

In the case where the user desires to know the time and/or distance the selected VCU 15 is from the selected location, the monitoring mechanism 69 is designed to retrieve from travel data storage unit 68 the coordinates of the destination specified by the user (if not provided in the request for travel data) and the current coordinates of the VCU 15 of interest to the user. Prior to retrieving this data, the monitoring mechanism 69 can be configured to update the travel data for the VCU 15 by transmitting an update request to the VCU 15 via vehicle communications device 52. Similar to the user communications devices 72, a plurality of vehicle communications devices 52 may be located at the BSCU 38 in order for multiple VCUs 15 to simultaneously communicate with the monitoring mechanism 69, as depicted by FIG. 5. The vehicle communications devices 52 are configured to communicate with the monitoring mechanism 69 through any suitable technique, such as time division multiplexing, for example.

After receiving the update request via communications devices 52 and 44, the vehicle manager 29 is designed to transmit the current values of the vehicle travel data to the monitoring manager 69. By updating the vehicle travel data before responding to the user's request for travel data, the monitoring mechanism 69 can ensure the accuracy of the response transmitted to the user.

After retrieving the coordinate values from the travel data storage unit 68, the monitoring mechanism 69 is designed to calculate the distance that the VCU 15 is from the selected destination based on the coordinate values of the VCU 15 and the coordinate values of the destination. If the preference data and/or request for travel data indicates that the user is to be notified when the VCU 15 is a certain time from the selected destination, the monitoring mechanism 69 is then designed to determine the estimated time of arrival of the VCU 15 at the destination based on this distance. As described previously, the monitoring mechanism 69 is designed to either assume that certain distances will take a certain amount of time to travel based on the type of traffic conditions usually encountered on the route or to calculate an average time previously required for VCUs 15 of the system to travel the route. To increase the accuracy of the calculations, the route should be divided into sections where the time required to travel each section is independently calculated. Furthermore, time delays associated with scheduled stops or deliveries can be factored into the calculations by assuming a delay time for each stop or delivery depending on the type of stop or delivery expected.

After calculating the distance and, if requested, the time the VCU 15 is from the destination, the monitoring mechanism 69 is configured to transmit the calculated values to the message manager 82. In response, the message manager 82 is designed to transmit the calculated information to the user via user communications device 72. Since the user already has an established communications connection with user communications device 72 when requesting travel data, there is no need for the message manager 82 to consult the contact information in the user database 78. The message manager 82 can simply transmit the data over the same connection. However, if desired, the message manager 82 may consult the contact information in the user database 78 to determine the user preferences in notification and notify the user of the distance and/or time accordingly.

The monitoring mechanism 69 can also be configured to transmit a command to a mapping system 86 (FIG. 5) to transmit mapping data to the message manager 82, if the user's request for travel data or user's preference data in data storage unit 68 includes a request for a mapping. The mapping system 86 may be any system known in the art for supplying a user with mapping data for rendering a display of a map. The command to the mapping system 86 preferably includes the coordinate values of the VCU 15 and the destination. In response, the mapping system 86 transmits to message manager 82 mapping data sufficient for forming a display map with the locations of the VCU 15 and the destination graphically displayed by the display map. The message manager 82 is designed to retrieve the contact information for the user requesting the travel data and is further configured to determine an address (e.g., an IP address or other type of address indicating how the mapping data is to be routed to user) associated with the user for sending the mapping data. The message manager 82 is then designed to transmit the mapping data to the retrieved address, which preferably identifies a computer at the user's premises 71. When the user's message device 75 (i.e., a computer in this case) receives the mapping data, the user's computer is configured to render a graphical display depicting a map that shows the VCU's location relative to the destination on the map.

If desired, the monitoring mechanism 69 can be configured to transmit the coordinate values of the VCU 15 to the mapping system 86 each time the coordinate values are updated. The user's request for travel data can request this feature or the user can indicate this desire in the preference data submitted during activation. Accordingly, for each update, the mapping system 86 is designed to transmit updated mapping data to the user's computer 75 via message manager 82, as previously described. As a result, the position of the VCU 15 is updated, and the user can monitor the progress of the VCU 15 on the display map rendered by the computer 75.

Although the preferred embodiment illustrates the requests for travel data by determining the distance the VCU 15 is from a particular location or by determining the time the VCU 15 is from the particular location, other information can be used to indicate the proximity of the VCU 15 from the particular location. For example, the message transmitted to the user in response to a request for travel data can indicate that the VCU 15 is currently at another particular location or landmark, preferably known to the user. Any other information indicating the proximity of the VCU 15 from a particular location can be used in implementing the principles of the present invention.

Operation

The preferred use and operation of the tracking system 10 and associated methodology are described hereafter with specific reference to FIGS. 1, 4 and 5.

Establishing User Preferences

Initially, a user at remote location 71 establishes communication with the message manager 82 via communications devices 72 and 73. As used herein, the term "remote location" shall refer to any location off the site of the BSCU 38. The user can establish communication via a telephone, an e-mail message, the Internet, or any other suitable communication medium. The message manager 82 preferably transmits a list of options to the user, such as whether the user would like to activate a monitoring of a particular vehicle, to retrieve travel data for a particular vehicle or to modify preferences previously selected by the user in an earlier communication session with the message manager 82. In response, the user selects the activation option.

The message manager 82 then prompts the user to select certain preferences. For example, the message manager 82 can request the user to identify a particular VCU 15 that the user wishes the system 10 to track and a particular destination for the selected VCU 15. If the user knows the identification number of the VCU 15 or vehicle stop number used by the system 10 to identify the particular VCU 15 and/or destination, the user can simply transmit a message including this information. As an example, the bus numbers and/or bus stops of commercial and state operated buses are usually available to the public. Therefore, the user may be aware of the bus number and/or stop number of a particular bus that the user wishes to ride, and the user can simply transmit the bus number and/or stop number to the message manager 82. Also, the user should be able to specify other identifying information such as the day or days of desired travel and the time of day of desired travel.

In the embodiment where the user is expecting to receive a package from a particular delivery vehicle, the user may be aware of the package number or delivery number used by the system 10. Therefore, by specifying the package number and the address that the vehicle is to deliver the package, the particular VCU 15 of the vehicle that is to deliver the package can be located by the system 10. In this regard, a database should be defined by the operators of the system 10 that relates package numbers to VCU 15 numbers.

Alternatively, if the user is unable to identify a particular vehicle or VCU 15, the message manager 82 can send information to the user that can be used to help the user identify a particular VCU 15. For example, the message manager 82 can transmit to the user a list of buses or a list of vehicle stops to the user. The user can use this information to select a particular VCU 15 that is suitable to the user.

Also, the message manager 82 can send map data from mapping system 86 to the user. The user can then view the map and select points on the map where the user would like to know when the VCU 15 reaches the selected point. The points available for selection can be predetermined, such as scheduled bus stops or other types of vehicle stops, or the user can be allowed to freely select any point on the map. In either case, the mapping logic preferably transmits the coordinates of the selected points to the message manager 82, which can use this information to not only identify the selected destination, but to also choose an appropriate VCU 15.

The message manager 82 also prompts the user to enter contact information such as how the user would like to be notified of an impending arrival of the selected VCU 15 at the selected destination. In response, the user selects a notification medium or combinations of media to be used to notify the user and supplies the necessary information to enable communication of the notification. For example, if the user selects a telephone as a notification medium, then the user provides a telephone number. In addition, if the user selects a computer as the notification medium, then the user provides a suitable address for the computer, such as an e-mail address or IP address. If the user selects a pager as the notification medium, then the user provides a pager number. It should be apparent to one skilled in the art when reading this disclosure that other types of notification media are possible without departing from the principles of the present invention. After receiving the desired contact information from the user, the message manager 82 stores the contact information in the user database 78.

The message manager 82 also prompts the user to transmit travel data preferences, which is information pertaining to when the user would like to be notified. For example, the user can select to be notified a certain time before the selected VCU 15 is to arrive at the selected destination. Also, the user can choose to be notified when the selected VCU 15 is within a certain distance of the destination, and the user can choose to be notified when the selected VCU 15 is a certain number of deliveries or stops away from the destination.

Since the monitoring mechanism 69 should have access to the travel data preferences in order to determine when a notification is appropriate, the message manager 82 preferably transmits the travel data preferences to the monitoring mechanism 69 along with a unique identification number that identifies the user and a unique identification number identifying the selected VCU 15. The unique identification number identifying the selected VCU 15 can be the vehicle number entered by the user provided that the number entered by the user identifies the VCU 15 to be monitored. In turn, the monitoring mechanism 69 stores this information as an entry in the travel data storage unit 68. All of the entries associated with a particular VCU 15 are preferably arranged together (based on the unique identification number) in the travel data storage unit 68. For example, each entry associated with a particular VCU 15 can be stored within a certain area of memory, or each of the entries can have a pointer pointing to another one of the entries associated with the particular VCU 15. Therefore, all of the entries associated with a particular VCU 15 can be easily located. Other methods known in the art for categorizing the entries and correlating the entries with a particular vehicle or with the travel data of a particular vehicle are also possible.

Once the message manager 82 has received the desired contact information and travel data preferences from the user, the communication between the message manager 82 and the user can be terminated. The base station manager 39 should now have sufficient information to monitor the selected VCU 15. If the user wishes to change the contact information and/or the travel data preferences, the user can reestablish communication with the message manager 82. The message manager 82 preferably recognizes the user's requests as an update rather than an activation and prompts the user to transmit the new information. In this regard, the message manager 82 can prompt the user for all of the desired contact information and/or preference data, similar to the activation session, and simply replace the previously stored contact information and/or preference data, or the message manager 82 can prompt the user for only the information to be updated and then merely update the previously stored information.

It should be noted that the information transferred between the user and the message manager 82 can be interfaced with the message manager 82 through a human operator during the activation session or update session described hereinabove and during other sessions, which will be described further hereinbelow. The human operator can prompt the user for certain information through a telephone call or other suitable medium of communication and can enter the response of the user into the message manager 82.

Monitoring the Vehicle

GPS satellites 23 transmit wireless signals 21*a*–21*c* to VCU 15 that can be analyzed through techniques well known in the art to determine a position of the VCU 15 relative to a particular reference point. For example, in GPS systems, the intersection of the Equator and the Prime Meridian is typically used as the reference point. Sensor 18 receives the signals 21*a*–21*c* and determines coordinate values representing the position of the VCU 15 relative to the reference point and transmits these values to vehicle manager 29.

The vehicle manager 29 stores the coordinate values received from sensor 18. The vehicle manager 29 also stores any other desired information as travel data. For example, the vehicle manager 29 can maintain a list of scheduled stops and/or packages to be delivered. This information can be updated as the stops are reached and/or the packages are delivered. Other types of desirable information may also be monitored by the vehicle manager 29 as travel data.

At desired times, the vehicle manager 29 transmits, via communications device 44, the stored travel data to cellular network 48. In this regard, the vehicle manager 29 can transmit the travel data continuously or at predetermined times (e.g., every five minutes or predetermined times of the day). Also, the base station manager 39 can transmit a request for an update to vehicle manager 29 via communication devices 44 and 52. In response to this request, the vehicle manager 29 can retrieve the current set of stored travel data and transmit it to the base station manager 39. In addition, the vehicle manager 29 can transmit the travel data to the base station manager 39 when scheduled stops or deliveries are reached or when other predetermined locations are passed.

Also, the base station manager 39 can assume that the VCU 15 is proceeding along a predetermined route at a predetermined rate, and the vehicle manager 29 can transmit vehicle data only when the VCU 15 is off schedule by a predetermined amount. Accordingly, the base station manager 39 can assume that the proximity of the VCU 15 is changing according to the predetermined schedule unless the base station manager 39 receives travel data from the vehicle manager 29, at which point the base station manager 39 updates the travel data storage unit 68 with the received travel data.

For example, an entry correlated with the VCU 15 in the travel data storage unit 68 can include a plurality of coordinate values representing locations along the VCU's route of travel. When the monitoring mechanism 69 desires to know the current location of the VCU 15, the monitoring mechanism 69 retrieves one of the coordinate values in the entry, depending on the amount of time that has elapsed since the VCU 15 began the route. For example, each successive coordinate value in the entry can correspond to the assumed location of the VCU 15 after a predetermined time interval (e.g., five minutes) of travel since the previous assumed location of the VCU 15. Therefore, the first coordinate value represents the starting point of the route. The second coordinate value represents the assumed location of the VCU 15 after the predetermined time interval (e.g., five minutes) from the start of the trip, the third coordinate value represents the assumed location of the VCU 15 after two times the predetermined time interval (e.g., ten minutes) of travel from the start of the trip, and so on.

When the vehicle associated with VCU 15 starts its route of travel, the current time period from a clock (e.g., an internal clock associated with BSCU 38) is stored into the entry in the travel data storage unit 68 correlated with the VCU 15. Therefore, the amount of time elapsed since the start of the route can be determined by comparing the current time period with the start time period stored in the travel data storage unit 68. To retrieve the current coordinate value of the VCU 15, the monitoring mechanism 69 retrieves the coordinate value corresponding with the amount of time that has elapsed since the start of the route. For example, assuming that the predetermined time interval between assumed locations is five minutes, the monitoring mechanism 69 retrieves the second coordinate value if approximately five minutes have elapsed since the start of the route and retrieves the third coordinate value if approximately ten minutes have elapsed since the start of the route.

However, if the VCU 15 is off schedule by a predetermined amount (e.g., one mile or two minutes from the assumed location or, in other words, is outside of a predetermined proximity from said assumed location), then the VCU 15 transmits its true coordinate values to the monitoring mechanism 69. In response, the monitoring mechanism 69 stores the true coordinate values in the entry corresponding with the VCU 15. Therefore, if a true coordinate value has been stored in the entry within the last five minutes (or some other threshold amount), then the monitoring mechanism 69 retrieves the last stored true coordinate value from VCU 15 instead of one of the assumed coordinate values.

The vehicle manager 29 can determine whether or not it is off schedule by comparing the coordinate values of the VCU's true location, as indicated by the GPS sensor 18, against the coordinate values of an assumed location. In this regard, the vehicle manager 29, like the monitoring mechanism 69 described hereinabove, maintains a list of coordinate values representing locations along the VCU's route of travel and determines the amount of time elapsed since the start of the route via a clock (such as an internal clock associated with the VCU 15). Like the monitoring mechanism 69, the vehicle manager 29 can retrieve the coordinate values of the assumed location of the VCU 15 depending on the amount of time elapsed since the start of the trip. Therefore, the coordinate values retrieved by the vehicle manager 29 for comparison with the current coordinate values indicated by the GPS sensor 18 represent the current location of the VCU 15, assuming the VCU 15 is on schedule. If the coordinate values of the assumed location differ from the coordinate values of the GPS sensor 18 by a predetermined amount, then the VCU 15 is off schedule, resulting in the transmission of the VCU's true location to monitoring mechanism 69.

Alternatively, the VCU 15 can transmit a value (such as a time period or distance) that the VCU 15 is off schedule, when the VCU 15 determines that it is off schedule by the predetermined amount. Therefore, monitoring mechanism 69 can determine the VCU's proximity by comparing the transmitted value against the assumed location of the VCU 15. When the VCU 15 transmits a time value (e.g., a value indicating the vehicle is off schedule by a certain time, such as two minutes for example), the monitoring mechanism 69 can determine an approximate arrival time at the selected destination by simply combining (i.e., adding or subtracting) the time indicated by the transmitted value with the total time that the route should take to travel. In this situation, the monitoring mechanism 69 does not need to keep track of the assumed locations of the VCU 15. Instead, the monitoring mechanism 69 can simply assume the VCU 15 will arrive at the destination or notification point at a predetermined time (based on the time of start and the total estimated time to reach the destination or the notification point) unless a time value is received. When a time value is received, the monitoring mechanism 69 can update the predetermined time based on the time value. Therefore, when the predetermined time (as updated) expires, notification should be sent to the user. It should be noted that other references and methodologies may be employed to determine when to transmit travel data from vehicle manager 29 to base station manager 39.

When the cellular network 48 receives travel data from communications device 44, the cellular network 48 preferably transmits the travel data to base station manager 39 via PSTN network 55 and communication device 52. Base station manager 39 receives the travel data and monitors the VCU's location based on the travel data.

In this regard, the monitoring mechanism 69 upon receiving travel data from VCU 15 stores the travel data, including the coordinate values of the VCU 15, into each entry of the travel data storage unit 68 that is configured to contain travel data and is associated with the VCU 15. After accessing an entry for storing travel data, the monitoring mechanism 69 compares the current travel data (either received from the VCU 15 or selected from a predetermined or assumed set of travel data, as described hereinabove) with the user preferences stored in the entry in order to determine whether a notification should be sent to the user. Alternatively, the monitoring mechanism 69 can be configured to periodically poll each entry in the travel data storage unit 68 and to compare the travel data in each entry with the corresponding preference data to determine which users should receive a notification.

In analyzing each entry, the monitoring mechanism 69 preferably subtracts the current coordinate values in the accessed entry of the VCU 15 with the coordinate values previously stored in travel data storage unit 68 that indicate the destination location selected by the user. If the resulting value is less than a predetermined value, then the monitoring mechanism 69 sends a notification command to message manager 82 instructing the message manager 82 to notify the user of the impending arrival of the VCU 15. This predetermined value corresponds to the distance that the VCU 15 should be from the destination before a notification is sent to the user. Preferably, this predetermined value is calculated from or is included in the preference data supplied by the user during activation or during an update to the activation.

The monitoring mechanism 69 can also send the notification command to the message manager 82 based on the estimated time the VCU 15 is from the destination. After calculating the value indicating the distance of the VCU 15 from the destination, the monitoring mechanism 69 can estimate how long it will take for the VCU 15 to reach the destination by assuming that the VCU 15 can travel certain distances in a certain amount of time. In order to increase the accuracy of the system 10, the monitoring mechanism 69 can vary the time for the distances according to the type of traffic that is typically encountered at the VCU's location and route of travel. If traffic conditions are usually congested along the VCU's route, then the monitoring mechanism 69 can assume higher rates of time. Furthermore, if the travel data indicates that the VCU 15 has a number of vehicle stops prior to reaching the destination, the monitoring mechanism 69 can factor in a delay time for each stop depending on the type of the stop.

Once the monitoring mechanism 69 determines the VCU's expected time of arrival at the destination, the monitoring mechanism 69 can determine whether the user should be notified based on this estimated time. If the estimated time is less than a predetermined value indicating the desired estimated time of arrival chosen by the user, then the monitoring mechanism 69 sends the notification command to the message manager 82.

The message manager 82, in response to the notification command from the monitoring mechanism 69, retrieves the contact information from user database 78 indicating how the user desires to be notified. Utilizing the contact information, the message manager 82 then sends a message to the user at remote location 71. The monitoring mechanism 69 preferably includes certain travel data in the notification command, such as the VCU's location. Consequently, the message manager 82 is able to include this travel data with the message sent to the user. For example, the message may indicate that the VCU 15 (and, therefore, that the vehicle attached to the VCU 15) is a certain amount of time or distance from the destination or the message may indicate the VCU's specific location, perhaps with reference to street names and/or street blocks.

If the contact information indicates that the user wishes to have map data sent to a computer at the remote location 71, the message manager 82 sends a request for map data to monitoring mechanism 69. In response, the monitoring mechanism 69 sends to the mapping system 86 the necessary data (e.g., the coordinates of the VCU 15 and the destination) for the mapping system 86 to transmit the appropriate mapping data. The mapping system 86 transmits the mapping data to message manager 82 which again utilizes the contact information retrieved from user data base 78 to communicate the mapping data to the appropriate message device 75 at remote location 71. The message device 75 then displays the mapping data in graphical form so that the user can see the vehicle's location relative to the destination within the map graphically displayed by the message device 75.

The notification message sent to the user indicates the impending arrival of the VCU 15 at the destination previously selected by the user. Accordingly, the user can prepare for the arrival of the VCU 15 knowing approximately how long it should take for the VCU 15 to arrive at the destination.

Requesting Travel Data

During the monitoring process described hereinabove, the user can discover the status of the VCU 15 or of the vehicle attached to the VCU 15, on demand, by contacting the base station manager 39 and requesting information pertaining to the travel data stored in the travel data storage unit 68. In this regard, the user establishes communication with the message manager 82 (FIG. 5) via communications devices 72 and 73. The medium used for communication can be any suitable medium known in the art (e.g., telephone, e-mail, Internet, cellular phone, etc.). The preferred operation of the present invention will be discussed hereinafter with the user establishing communication via telephone, although other media of communication are also suitable.

After the telephone connection is established, the message manager 82 prompts the user with a series of recorded questions or options in order to determine the user's request. The user responds to these prompts through touch-tone signaling which is well known in current telephony communications systems. Initially, the message manager 82 prompts the user to indicate whether the call is an activation, an update of an activation, or a request for travel data. The user selects the appropriate touch-tone number to indicate that the user is requesting travel data.

The message manager 82 receives and interprets the touch-tone signal to determine that the user is requesting travel data. In response, the message manager 82 prompts the user to transmit an identification number of the VCU 15 of concern for the user. This prompt can include information to aide the user in selecting a VCU 15. The user responds by transmitting a series of touch-tone signals that indicate the identification number or other unique data of the particular VCU 15 of concern for the user. The message manager 82 receives and interprets the touch-tone signals and determines which VCU 15 is selected by the user based on the received touch-tone signals.

The message manager 82 can then, if desired, prompt the user to indicate which travel data the user desires to know. For example, it is likely that the user may want to know how far the VCU 15 is from the destination or how long it should take the VCU 15 to arrive at the destination. However, the user may want to know other information, such as, but not limited to, how many vehicle stops the VCU 15 encounters enroute or the type of vehicle that is enroute, etc. The user responds with touch-tone signals, as appropriate, to indicate what information the user is requesting.

The message manager 82 then transmits a request for data to the monitoring mechanism 69. The request for data includes the unique identification number used to identify the VCU 15, as well as any other information needed by the monitoring mechanism 69 to provide the desired information. For example, the message manager 82 may also transmit information indicating that the user wishes to discover information pertaining to the type of vehicle that is enroute. The monitoring mechanism 69, in turn, retrieves the desired travel data from the travel data storage unit 68.

After retrieving the desired travel data, the monitoring mechanism 69 transmits the retrieved data to the message manager 82, which communicates the data information to the user in a message transmitted to the user. The message can include the travel data retrieved by the monitoring mechanism 69 or can be formed to indicate the information contained by the travel data. For example, when communication is over a telephone connection, a recorded message can be formed by the message manager 82 indicating the distance the VCU 15 is from the destination based on the travel data sent to the message manager 82. When communication is via modem signals, travel data can be transmitted to the user by the message device 82. In either case, the contents of the message is based on the travel data retrieved by the monitoring mechanism 69. Since a communications line between the user and message manager 82 is already established in order for the user to make the request for travel data, the message manager 82 preferably transmits the data to the user over the established communication connection. When the user desires to receive map data (indicated by the selection of an option during the request for travel data or by the user preferences stored in the travel data storage unit 68), the monitoring mechanism 69 transmits a map generation command and travel data of the selected VCU 15 to mapping system 86. Mapping system 86 then transmits graphical data to message manager 82.

Message manager 82 communicates the graphical data to message device 75 which is capable of generating a map display based on the graphical data. In order to communicate this data, the message manager 82 retrieves the user contact information from the user database 78. The contact information indicates the address (and/or other pertinent information) of the message device 75 so that the message manager 82 knows where to transmit the graphical data. By viewing the map display generated by the message device 75, the user can determine the location and estimated time of arrival of the VCU 15. The map display preferably shows the intended route of travel by the VCU 15 and any scheduled vehicle stops along the route.

Since the system 10 stores certain travel information in order to monitor the travel 15 of a VCU 15 for providing an advance notification of an impending arrival of a VCU 15, the system 10 can also provide an easy and low cost way for a user to access information pertaining to the VCU 15, on demand. Accordingly, the user does not have to wait for preselected preferences to be satisfied before learning of the VCU's (and, therefore, the vehicle's) location and/or estimated time of arrival. The user can monitor the travel of the VCU 15 at any time by submitting a request for travel data and can, therefore, know the location and status of the VCU 15 before receiving an advance notification signal that is based on comparisons between the VCU's travel data and the user's preselected preferences. As a result, the user can better prepare for an arrival of any particular VCU 15 or vehicle attached to the VCU 15 associated with the system 10.

It should be apparent to one skilled in the art that at least a portion of the functionality of the data manager 67 can be implemented by the vehicle manager 29, if desired. In this regard, preference data and/or travel data for the VCU 15 can be stored in the computer system 31*a* coupled to the VCU 15. Accordingly, it is possible for the vehicle manager 29, among other functionality, to determine when to transmit a notification to the user and to transmit a notification to the user via communication devices 52 and 72. However, such an implementation can increase the complexity and cost of the system 10 and is therefore generally not desirable.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A system for automatically reporting upon travel status of vehicles in response to activation requests by users at remote locations, comprising:

a data manager configured to receive an activation request, said activation request including a vehicle indicator and a location indicator, said data manager further configured to automatically correlate said vehicle indicator with a vehicle and said location indicator with a location along a route of travel of said vehicle, to automatically identify a proximity based on said location indicator, to track travel of said vehicle based on travel data received from said vehicle, said travel data identifying said vehicle, and to automatically transmit a message in response to a determination that said vehicle is within said identified proximity; and a communications interface configured to receive said activation request from a user at a remote location, to automatically transmit said activation request to said data manager, to receive said message from said data manager, and to transmit said message to said user.

2. The system of claim 1, wherein said communications interface is one or more telephone interface devices.

3. The system of claim 1, wherein said identified proximity is defined by time.

4. The system of claim 1, wherein said identified proximity is defined by distance.

5. The system of claim 1, wherein said identified proximity is defined by a predetermined location along said route of travel.

6. The system of claim 1, wherein said vehicle is a bus and said location is a bus stop.

7. The system of claim 1, wherein said vehicle indicator identifies said vehicle and said location indicator identifies said location.

8. The system of claim 1, further comprising a vehicle manager configured to transmit travel data to said data manager via a control channel of a cellular network.

9. The system of claim 1, further comprising a vehicle manager configured to transmit said travel data to said data manager via a voice channel of a cellular network.

10. The system of claim 1, wherein said data manager further comprises a monitoring mechanism configured to receive said travel data from said vehicle, to compare said travel data with a coordinate value indicating a proximity of said location, and to correlate said travel data with said coordinate value based on said vehicle indicator and said location indicator.

11. The system of claim 1, wherein said activation request includes contact information identifying a user communication device associated with said user, and wherein said communications interface is further configured to transmit said message to said user communications device based on said contact information.

12. The system of claim 1, further comprising:

a location sensor coupled to said vehicle and configured to determine a location of said sensor, said location sensor further configured to transmit signals based on locations determined by said location sensor; and a vehicle manager coupled to said location sensor and configured to wirelessly transmit said travel data, said travel data based on said signals transmitted from said location sensor.

13. The system of claim 12, wherein said vehicle manager is configured to transmit said travel data to said data manager in response to a determination that said vehicle is off schedule, and wherein said data manager, in tracking said vehicle, is configured to assume that said vehicle is on schedule unless said data manager receives said travel data transmitted from said vehicle.

14. A system, comprising:

a data manager configured to receive a vehicle indicator and a location indicator, to identify a proximity based on said location indicator, to identify a vehicle based on said vehicle indicator, to monitor travel of said vehicle, to analyze travel data indicative of whether said vehicle is within said proximity, to determine whether to transmit a message based on said travel data and said vehicle indicator, and to transmit said message in response to a determination that said vehicle is within said proximity; and a communications interface configured to receive said vehicle indicator and said location indicator from a user at a remote location, to transmit said vehicle indicator and said location indicator to said data manager, to receive said message from said data manager, and to transmit said message to said user.

15. The system of claim 14, wherein said communications interface is one or more telephone interface devices.

16. The system of claim 14, further comprising a vehicle manager configured to transmit said travel data to said data manager via a control channel of a cellular network.

17. The system of claim 14, further comprising a vehicle manager configured to transmit said travel data to said data manager via a voice channel of a cellular network.

18. The system of claim 14, wherein said identified proximity is defined by time.

19. The system of claim 14, wherein said identified proximity is defined by distance.

20. The system of claim 14, wherein said identified proximity corresponds with a predetermined location along said route of travel.

21. The system of claim 14, wherein said vehicle is a bus and said location is a bus stop.

22. The system of claim 14, wherein said vehicle indicator identifies said vehicle and said location indicator identifies said location.

23. The system of claim 14, further comprising:

a location sensor coupled to said vehicle and configured to determine a location of said sensor, said location sensor further configured to transmit signals based on locations determined by said location sensor; and a vehicle manager coupled to said location sensor and configured to wirelessly transmit said travel data, said travel data based on said signals transmitted from said location sensor.

24. The system of claim 23, wherein said vehicle manager is configured to transmit said travel data in response to a determination that said vehicle is off schedule, and wherein said data manager, in tracking said vehicle, is configured to assume that said vehicle is on schedule unless said data manager receives said travel data transmitted from said vehicle.

25. A system for automatically reporting upon travel status of vehicles in response to activation requests by users at remote locations, comprising:

means for receiving an activation request from a user at a remote location, said activation request including a vehicle indicator and a location indicator;

means for identifying a vehicle based on said vehicle indicator;

means for identifying a location based on said location indicator;

means for specifying a proximity based on said location;

means for monitoring travel of said vehicle;

means for analyzing travel data indicative of whether said vehicle is within said specified proximity;

means for determining whether to transmit a message to said user based on said analyzing means and said vehicle indicator; and means for transmitting said message to said user based on said determining means.

26. The system of claim 25, wherein said activation request, further includes contact information and wherein said system further comprises:

means for storing said contact information; and means for retrieving said contact information in response to a determination by said determining means to transmit said message, wherein said transmitting means transmits said message based on said contact information.

27. The system of claim 25, further comprising a means for communicating said travel data via a control channel associated with a cellular network.

28. The system of claim 27, wherein said communicating means includes a means for changing an identifier associated with said communicating means.

29. The system of claim 27, wherein said communicating means includes a means for appending said travel data to a feature request.

30. A method for automatically activating vehicle status reporting within a vehicle tracking system, comprising the steps of:

receiving a vehicle indicator and a location indicator from a user at a remote location;

identifying a vehicle based on said vehicle indicator;

identifying a proximity based on said location indicator;

receiving travel data identifying said vehicle and indicating a location of said vehicle;

monitoring travel of said vehicle based on said travel data;

determining, based on said monitoring step, whether said vehicle is within said proximity; and transmitting a message to said user in response to a determination in said determining step that said vehicle is within said proximity.

31. The method of claim 30, wherein said monitoring step further comprises the step of:

assuming that said vehicle is traveling along a route at a predetermined rate of travel until said receiving step.

32. The method of claim 30, wherein said receiving a vehicle indicator and a location indicator step includes the step of receiving, from said user, an activation request that includes said vehicle indicator, said location indicator, and contact information, and wherein said transmitting step includes the step of transmitting said message based on said contact information.

33. The method of claim 30, further comprising the step of communicating said travel data via a data channel associated with a cellular network.

34. The method of claim 33, further comprising the step of changing an identifier associated with a communications device transmitting said travel data.

35. The method of claim 33, further comprising the step of appending said travel data to a cellular feature request.

36. A method for enabling reporting of impending vehicle arrivals, comprising the steps of:

receiving a vehicle indicator and a location indicator from a remote user, said vehicle indicator identifying a vehicle and said location indicator indicating a location along a route of travel of said vehicle;

identifying a proximity based on said location indicator;

monitoring travel of said vehicle as said vehicle travels along said route; and transmitting a message to said user, based on said monitoring step, when said vehicle is within said proximity.

37. A system for automatically monitoring and reporting upon travel status of vehicles in response to an activation request by users at remote locations, comprising:

a data manager configured to receive a vehicle indicator and a location indicator, to automatically correlate said vehicle indicator with a vehicle and said location indicator with a location along a route of travel of said vehicle, and to transmit a message in response to a determination that said vehicle is within a predetermined proximity of said location; and a communications interface configured to receive said vehicle indicator and said location indicator from a user at a remote location, to transmit said vehicle indicator and said location indicator to said data manager, and to receive said message from said data manager and to transmit said message to said user.

38. The system of claim 37, wherein said vehicle indicator and said location indicator are included in an activation request that also includes contact information identifying a remote communication device associated with said user, wherein said communications interface is further configured to transmit said message based on said contact information.

39. The system of claim 37, further comprising:

a location sensor coupled to said vehicle and configured to determine a location of said sensor, said location sensor further configured to transmit signals based on locations determined by said location sensor; and a vehicle manager coupled to said location sensor and configured to wirelessly transmit travel data to said data manager, said travel data based on said signals transmitted from said location sensor.

40. The system of claim 39, wherein said vehicle manager is configured to transmit said travel data to said data manager in response to a determination that said vehicle is off schedule, and wherein said data manager is configured to assume that said vehicle is on schedule unless said data manager receives said travel data.

41. A system, comprising:

a data manager configured to receive a vehicle indicator and a location indicator, to retrieve location data based on said location indicator, to correlate said location data with travel data based on said vehicle indicator, to compare said location data to said travel data, and to transmit a message in response to a determination that said vehicle is a predetermined proximity from a first location along a route of travel of said vehicle, said location data indicating said first location and said travel data indicating a second location of said vehicle along said route of travel; and a communications interface configured to receive said vehicle indicator and said location indicator from a user at a remote location, to transmit said vehicle indicator and said location indicator to said data manager, to receive said message from said data manager, and to transmit said message to said user.

42. The system of claim 41, wherein said vehicle indicator and said location indicator are included in an activation request that also includes contact information identifying a remote communication device associated with said user, wherein said communications interface is further configured to transmit said message based on said contact information.

43. The system of claim 41, further comprising:

a location sensor coupled to said vehicle and configured to determine a location of said sensor, said location sensor further configured to transmit signals based on locations determined by said location sensor; and a vehicle manager coupled to said location sensor and configured to wirelessly transmit travel data to said data manager, said travel data based on said signals transmitted from said location sensor.

44. The system of claim 43, wherein said vehicle manager is configured to transmit said travel data to said data manager in response to a determination that said vehicle is off schedule, and wherein said data manager is configured to assume that said vehicle is on schedule unless said data manager receives said travel data.

45. A method for automatically activating a vehicle tracking system, comprising the steps of:

receiving a vehicle indicator and a location indicator from a user at a remote location;

identifying a vehicle based on said vehicle indicator;

monitoring travel of said vehicle;

retrieving location data based on said location indicator;

comparing said location data to travel data associated with said vehicle;

determining whether said vehicle is within a predetermined proximity of a location defined in data by said location data; and transmitting a message to said user in response to a determination in said determining step that said vehicle is within said predetermined proximity of said location.

46. The method of claim 45, wherein said monitoring step further comprises the steps of:

receiving a notification message from said vehicle;

assuming that said vehicle is traveling along a predetermined route at a predetermined rate of travel until said receiving step; and determining a location of said vehicle based on said assuming step.

47. The method of claim 45, wherein said receiving a vehicle indicator and a location indicator step includes the step of receiving, from said user, an activation request that includes said vehicle indicator, said location indicator, and contact information, and wherein said transmitting step includes the step of transmitting said message based on said contact information.

* * * * *